United States Patent
Miyahara et al.

(10) Patent No.: US 10,885,788 B2
(45) Date of Patent: Jan. 5, 2021

(54) NOTIFICATION CONTROL APPARATUS AND METHOD FOR CONTROLLING NOTIFICATION

(71) Applicant: MITSUBISHI ELECTRIC CORPORATION, Tokyo (JP)

(72) Inventors: Tadashi Miyahara, Tokyo (JP); Mitsuo Shimotani, Tokyo (JP); Naohiko Obata, Tokyo (JP); Yoshinori Ueno, Tokyo (JP); Yuji Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/487,595

(22) PCT Filed: Apr. 24, 2017

(86) PCT No.: PCT/JP2017/016141
§ 371 (c)(1),
(2) Date: Aug. 21, 2019

(87) PCT Pub. No.: WO2018/198156
PCT Pub. Date: Nov. 1, 2018

(65) Prior Publication Data
US 2020/0058222 A1    Feb. 20, 2020

(51) Int. Cl.
*G08G 1/00* (2006.01)
*G08G 1/16* (2006.01)
(Continued)

(52) U.S. Cl.
CPC ............. *G08G 1/166* (2013.01); *B60Q 1/503* (2013.01); *G08G 1/005* (2013.01);
(Continued)

(58) Field of Classification Search
CPC ........ G08G 1/166; G08G 1/005; B60Q 1/503; B60Q 2400/50; G06F 3/017; G10L 15/22
(Continued)

(56) References Cited

U.S. PATENT DOCUMENTS 5,638,116 A * 6/1997 Shimoura ............ G05D 1/0246
348/118
10,237,211 B2 * 3/2019 Arita ........................ B60R 1/00
(Continued)

FOREIGN PATENT DOCUMENTS

DE           1939986 U    11/2012
DE     102012009555 A1    11/2012
(Continued)

OTHER PUBLICATIONS

German Office Action for German Application No. 112017007284.0, dated Feb. 12, 2020, with English translation.
(Continued)

*Primary Examiner* — Ojiako K Nwugo
(74) *Attorney, Agent, or Firm* — Birch, Stewart, Kolasch & Birch, LLP

(57) ABSTRACT

An object of the present invention to provide a notification control apparatus and a method for controlling notification that achieve display to a notification target with improved accuracy. A notification control apparatus in the present invention includes the following: an attribute detecting unit that detects an attribute of an object located around a subject vehicle; an input recognizing unit that recognizes an input message entered by the driver of the subject vehicle; a message converting unit that converts, in accordance with the attribute detected by the attribute detecting unit, the input message recognized by the input recognizing unit into a notification message indicating the same meaning as the input message; and a road projection controller that controls
(Continued)

projection of the notification message converted by the message converting unit onto at least part of a road located around the object.

20 Claims, 21 Drawing Sheets

(51) Int. Cl.
*B60Q 1/50* (2006.01)
*G08G 1/005* (2006.01)
*G06F 3/01* (2006.01)
*G10L 15/22* (2006.01)

(52) U.S. Cl.
CPC .......... *B60Q 2400/50* (2013.01); *G06F 3/017* (2013.01); *G10L 15/22* (2013.01)

(58) Field of Classification Search
USPC ........................................................ 340/468
See application file for complete search history.

(56) References Cited

U.S. PATENT DOCUMENTS

| | | | | |
|---|---|---|---|---|
| 2004/0246167 A1* | 12/2004 | Kumon | .................. | G01S 7/412 342/70 |
| 2006/0077050 A1* | 4/2006 | Takahashi | .............. | B60Q 9/008 340/435 |
| 2011/0044497 A1* | 2/2011 | Doretto | ................. | G06K 9/525 382/103 |
| 2012/0296523 A1* | 11/2012 | Ikeda | ................. | B62D 15/0275 701/41 |
| 2014/0132767 A1* | 5/2014 | Sonnabend | ........ | G06K 9/00476 348/148 |
| 2014/0146172 A1* | 5/2014 | Kajitani | ............. | G06K 9/00979 348/143 |
| 2015/0002638 A1* | 1/2015 | Suzuki | ................. | G01B 11/026 348/47 |
| 2015/0232018 A1* | 8/2015 | Augst | ..................... | G09F 19/18 340/468 |
| 2018/0307238 A1* | 10/2018 | Wisniowski | ............ | G01S 7/497 |
| 2019/0197345 A1* | 6/2019 | Sawada | .................... | G06T 7/10 |

FOREIGN PATENT DOCUMENTS

| | | |
|---|---|---|
| DE | 102012219574 A1 | 4/2014 |
| DE | 102013214481 A1 | 1/2015 |
| DE | 102014213414 A1 | 1/2016 |
| DE | 10014226254 A1 | 6/2016 |
| JP | 2005-332297 A | 12/2005 |
| JP | 2008-7079 A | 1/2008 |
| JP | 2008-9941 A | 1/2008 |
| JP | 2008-126954 A | 6/2008 |
| JP | 2008-287669 A | 11/2008 |

OTHER PUBLICATIONS

International Search Report, issued in PCT/JP2017/016141, dated Aug. 1, 2017.
Japanese Office Action, dated Jan. 14, 2020, for Japanese Application No. 2019-514889, with an English translation.

* cited by examiner

F I G . 1
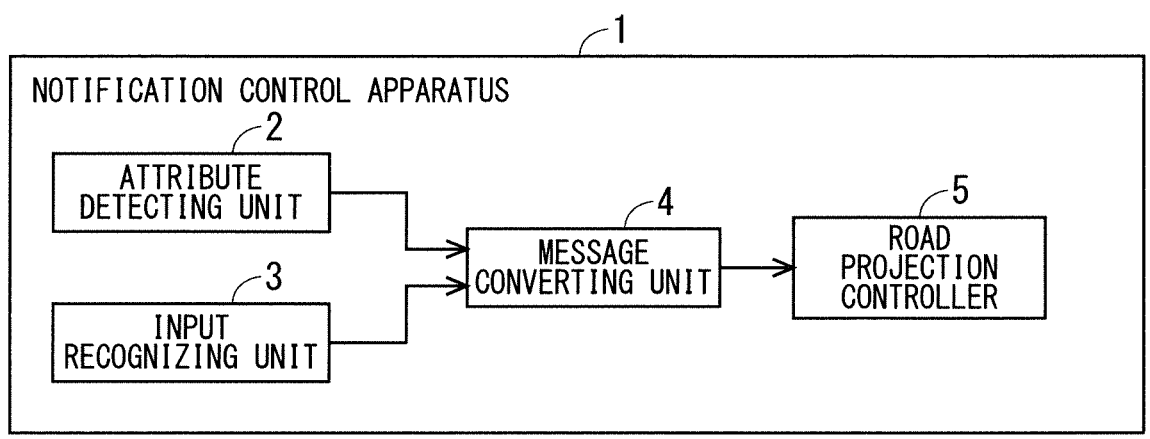

NOTIFICATION CONTROL APPARATUS AND METHOD FOR CONTROLLING NOTIFICATION

TECHNICAL FIELD

The present invention relates to a notification control apparatus that controls notification of a driver's intention to a human being or an animal located around a subject vehicle. The present invention also relates to a method for controlling such notification.

BACKGROUND ART

A conventionally disclosed technique is to estimate a driver's intention from a driver's line of sight, the speed of a driver's vehicle, driver's braking, driver's steering, and other things, and to display the estimated intention onto a display located within the vehicle, thus informing a pedestrian of the driver's intention (c.f., Patent Document 1). Another disclosed technique is to project an image warning a pedestrian that a vehicle is approaching, onto a road on which the pedestrian is located (c.f., Patent Document 2).

PRIOR ART DOCUMENTS

Patent Documents

Patent Document 1: Japanese Patent Application Laid-Open No. 2005-332297
Patent Document 2: Japanese Patent Application Laid-Open No. 2008-7079

SUMMARY

Problem to be Solved by the Invention

Patent Documents 1 and 2 describe sending a predetermined message to the notification target, regardless of the attribute of the notification target. Accordingly, for a message written in Chinese characters, a child who cannot read Chinese characters has difficulty in understanding the driver's intention; or for a message written in small letters, an elderly person has difficulty in understanding the driver's intention. These conventional techniques unfortunately fail to display the driver's intention to the notification target with high accuracy.

To solve this problem, it is an object of the present invention to provide a notification control apparatus and a method for controlling notification that achieve display to the notification target with improved accuracy.

Means to Solve the Problem

A notification control apparatus in the present invention includes the following: an attribute detecting unit that detects an attribute of an object located around a subject vehicle; an input recognizing unit that recognizes an input message entered by the driver of the subject vehicle; a message converting unit that converts, in accordance with the attribute detected by the attribute detecting unit, the input message recognized by the input recognizing unit into a notification message indicating the same meaning as the input message; and a road projection controller that controls projection of the notification message converted by the message converting unit onto at least part of a road located around the object.

A method for controlling notification in the present invention includes the following: detecting an attribute of an object located around a subject vehicle; recognizing an input message entered by the driver of the subject vehicle; converting, in accordance with the detected attribute, the recognized input message into a notification message indicating the same meaning as the input message; and controlling projection of the converted notification message onto at least part of a road located around the object.

Effects of the Invention

According to the present invention, the notification control apparatus includes the following: the attribute detecting unit that detects the attribute of the object located around the subject vehicle; the input recognizing unit that recognizes the input message entered by the driver of the subject vehicle; the message converting unit that converts, in accordance with the attribute detected by the attribute detecting unit, the input message recognized by the input recognizing unit into the notification message indicating the same meaning as the input message; and the road projection controller that controls projection of the notification message converted by the message converting unit onto at least part of the road located around the object. The notification control apparatus thus improves the accuracy of display to a notification target.

The method for controlling notification includes the following: detecting the attribute of the object located around the subject vehicle; recognizing the input message entered by the driver of the subject vehicle; converting, in accordance with the detected attribute, the recognized input message into the notification message indicating the same meaning as the input message; and controlling projection of the converted notification message onto at least part of the road located around the object. The method thus improves the accuracy of display to a notification target.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram illustrating one example of the configuration of a notification control apparatus according to a first embodiment of the present invention.

DESCRIPTION OF EMBODIMENT(S)

Figure 2:
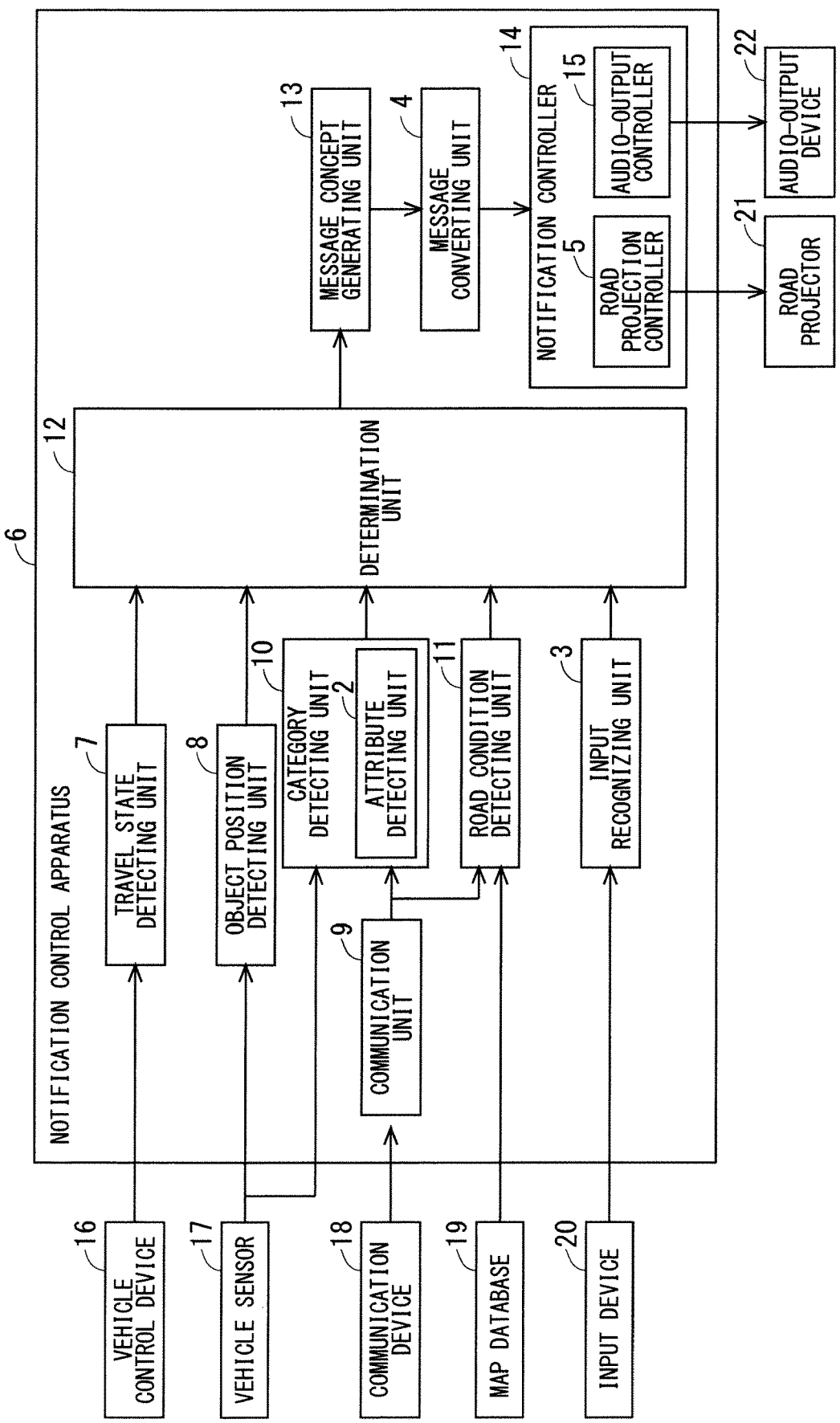
FIG. 2 is a block diagram illustrating one example of the configuration of the notification control apparatus according to the first embodiment of the present invention.

The embodiments of the present invention will be described with reference to the drawings.

First Embodiment

<Configuration>

The following describes the configuration of a notification control apparatus according to a first embodiment of the present invention.

FIG. 1 is a block diagram illustrating one example of the configuration of a notification control apparatus 1 according to the first embodiment. FIG. 1 shows minimal components necessary for constituting the notification control apparatus according to the embodiment.

As illustrated in FIG. 1, the notification control apparatus 1 includes an attribute detecting unit 2, an input recognizing unit 3, a message converting unit 4, and a road projection controller 5. The attribute detecting unit 2 detects the attribute of an object located around a subject vehicle. The input recognizing unit 3 recognizes an input message entered by the driver of the subject vehicle. In accordance with the attribute detected by the attribute detecting unit 2, the message converting unit 4 converts the input message recognized by the input recognizing unit 3 into a notification message indicating the same meaning as the input message. The road projection controller 5 controls projection of the notification message converted by the message converting unit 4 onto at least part of a road located around the object.

Here, the input message and the notification message are each a message that should be notified to a notification target, which is the object.

The following describes the configuration of another notification control apparatus including the notification control apparatus 1 illustrated in FIG. 1.

FIG. 2 is a block diagram illustrating one example of the configuration of a notification control apparatus 6.

As illustrated in FIG. 2, the notification control apparatus 6 includes the input recognizing unit 3, a travel state detecting unit 7, an object position detecting unit 8, a communication unit 9, a category detector 10, a road condition detecting unit 11, a determining unit 12, a message concept generating unit 13, the message converting unit 4, and a notification controller 14. The category detector 10 includes the attribute detecting unit 2. The notification controller 14 includes the road projection controller 5 and an audio-output controller 15.

The input recognizing unit 3 is connected to an input device 20. The travel state detecting unit 7 is connected to a vehicle control device 16. The object position detecting unit 8 and the category detector 10 are connected to a vehicle sensor 17. The communication unit 9 is connected to a communication device 18. The road condition detecting unit 11 is connected to a map database 19. The road projection controller 5 is connected to a road projector 21. The audio-output controller 15 is connected to an audio-output device 22.

The input recognizing unit 3 recognizes an input message that is input to the input device 20 by the driver. Examples of driver's input include the driver's selection of information displayed on a screen, the driver's audio input of his/her intention, and the driver's input of his/her intention through a gesture. Examples of the input device 20 include a touch panel, a microphone, and a camera.

The travel state detecting unit 7 detects the travel state of the subject vehicle on the basis of information acquired from the vehicle control device 16. To be specific, the travel state detecting unit 7 detects, as the travel state, the speed and direction of travel of the subject vehicle and other things that are based on the driver's operation of the accelerator, brake, steering wheel, and other things. The vehicle control device 16 includes a sensor that detects the travel state of the subject vehicle based on the operation of the accelerator, brake, steering wheel, and other things. Examples of the sensor, detecting the travel state of the subject vehicle, include a vehicle speed sensor and a steering angle sensor.

The object position detecting unit 8 detects the position of an object relative to the subject vehicle on the basis of information acquired from the vehicle sensor 17. The vehicle sensor 17 is installed in the subject vehicle and includes a camera, a millimeter-wave radar, an ultrasonic sensor, and other things. Further, the vehicle sensor 17 may include a global positioning system (GPS) for acquiring the current position of the subject vehicle.

The communication unit 9 communicates with outside via a communication device 18 to acquire, for instance, information about road congestion and whether there is a vehicle ahead of the subject vehicle. The communication unit 9 also communicates with a portable communication terminal (not shown) to acquire various information items from the portable communication terminal.

The category detector 10 detects the category of the object located around the subject vehicle, from an image taken by a camera, which is the vehicle sensor 17. Here, examples of the category of the object include a human being, an animal, an obstacle, and a building.

The attribute detecting unit 2 detects the attribute of the object located around the subject vehicle, from an image taken by a camera, which is the vehicle sensor 17. The attribute detecting unit 2 also detects the attribute of the object located around the subject vehicle, on the basis of the information acquired by the communication unit 9 through the external portable communication terminal. Here, examples of the attribute of the object include person's age, person's physical features, the orientation of the person's face, and the language used by the person.

The road condition detecting unit 11 detects a road condition in the direction of travel of the subject vehicle on the basis of the information acquired from the communication unit 9 or the map database 19. Here, examples of the road condition include whether there is an intersection in the direction of travel of the subject vehicle, whether there is a crosswalk in the direction of travel of the subject vehicle, and the shape of a road along which the subject vehicle travels. The communication unit 9 may acquire information about an intersection, information about a crosswalk, information about road shape, and other information items, from outside via the communication device 18. The map database 19 consists of a storing device, such as a hard disk drive (HDD) or a semiconductor memory, and contains map information. The map information includes information about an intersection, information about a crosswalk, information about road shape, and other information items.

The determining unit 12 determines the presence or absence of the object to be notified, on the basis of the travel state detected by the travel state detecting unit 7, the relative position of the object detected by the object position detecting unit 8, and the road condition detected by the road condition detecting unit 11.

The message concept generating unit 13 generates the concept of the input message that is notified to the notification target, from the input message recognized by the input recognizing unit 3. The message converting unit 4 converts the concept of the input message generated by the message concept generating unit 13 into a notification message indicating the same meaning as the input message. As described above, the input message takes the form of an input on a screen, an audio input, or an input through a gesture. In some cases, the message converting unit 4 converts the concept of the input message into a notification message that takes a different form from the input message. In other cases, the message converting unit 4 converts the concept of the input message into a notification message that takes the same form as the input message. For an audio input or an input through a gesture, the input message takes a different form from the notification message. For an input on a screen, the input message takes the same form as the notification message.

The road projection controller 5 controls the road projector 21 to project the notification message converted by the message converting unit 4 onto at least part of a road located around the object. The road projector 21 projects the notification message onto at least part of the road located around the object under the control of the road projection controller 5.

The audio-output controller 15 controls the audio-output device 22 to output, to the notification target by sound, the notification message converted by the message converting unit 4. The audio-output device 22 outputs the notification message to the notification target by sound under the control of the audio-output controller 15.

Figure 3:
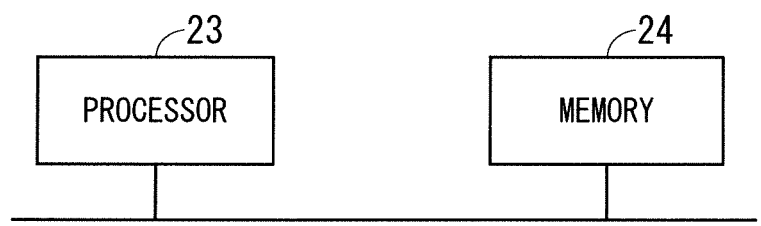
FIG. 3 is a block diagram illustrating one example of the hardware configuration of the notification control apparatus according to the first embodiment of the present invention.

FIG. 3 is a block diagram illustrating one example of the hardware configuration of the notification control apparatus 6. This hardware configuration is applied to the notification control apparatus 1.

A processing circuit implements the functions of the input recognizing unit 3, the travel state detecting unit 7, the object position detecting unit 8, the communication unit 9, the category detector 10, the attribute detecting unit 2, the road condition detecting unit 11, the determining unit 12, the message concept generating unit 13, the message converting unit 4, the road projection controller 5, and the audio-output controller 15 of the notification control apparatus 6. That is, the notification control apparatus 6 includes a processing circuit for performing the following functions: recognizing an input message; detecting the travel state of a subject vehicle, detecting the position of an object relative to the subject vehicle; communicating with outside; detecting the category of the object located around the subject vehicle; detecting the attribute of the object located around the subject vehicle; detecting a road condition in the direction of travel of the subject vehicle; determining the presence or absence of the object to be notified; generating the concept of the input message that is notified to a notification target; converting the concept of the input message into a notification message indicating the same meaning as the input message; controlling the road projector 21 to project the notification message onto at least part of a road located around the object; and controlling the audio-output device 22 to output the notification message to the notification target by sound. The processing circuit is a processor 23 that executes a program stored in a memory 24. Examples of the processor 23 include a central processing unit, a processing unit, a calculating unit, a microprocessor, a microcomputer, and a digital signal processor (DSP).

Software, firmware, or a combination of software and firmware implements the functions of the input recognizing unit 3, the travel state detecting unit 7, the object position detecting unit 8, the communication unit 9, the category detector 10, the attribute detecting unit 2, the road condition detecting unit 11, the determining unit 12, the message concept generating unit 13, the message converting unit 4, the road projection controller 5, and the audio-output controller 15 of the notification control apparatus 6. The software or firmware is written as a program and stored in the memory 24. The processing circuit reads and executes the program, stored in the memory 24, to implement the function of each component. That is, the notification control apparatus 6 includes the memory 24 for storing a program that executes the following process steps: recognizing an input message; detecting the travel state of a subject vehicle; detecting the position of an object relative to the subject vehicle; communicating with outside; detecting the category of the object located around the subject vehicle; detecting the attribute of the object located around the subject vehicle; detecting a road condition in the direction of travel of the subject vehicle; determining the presence or absence of the object to be notified; generating the concept of the input message that is notified to a notification target; converting the concept of the input message into a notification message indicating the same meaning as the input message; controlling the road projector 21 to project the notification message onto at least part of a road located around the object; and controlling the audio-output device 22 to output the notification message to the notification target by sound. This program is for controlling a computer to execute the procedure or method of the input recognizing unit 3, the travel state detecting unit 7, the object position detecting unit 8, the communication unit 9, the category detector 10, the attribute detecting unit 2, the road condition detecting unit 11, the determining unit 12, the message concept generating unit 13, the message converting unit 4, the road projection controller 5, and the audio-output controller 15. Here, the memory may be a volatile or non-volatile semiconductor memory (e.g., a random access memory or RAM for short, a read only memory or ROM for short, a flash memory, an erasable programmable read only memory or EPROM for short, or an electrically erasable programmable read only memory or EEPROM for short), a magnetic disk, a flexible disk, an optical disk, a compact disk, a mini disk, a DVD, or other things. Alternatively, the memory may be any kind of storing medium that will be used in the future.

<Operation>

The following describes a process performed in the notification control apparatus 6.

Figure 4:
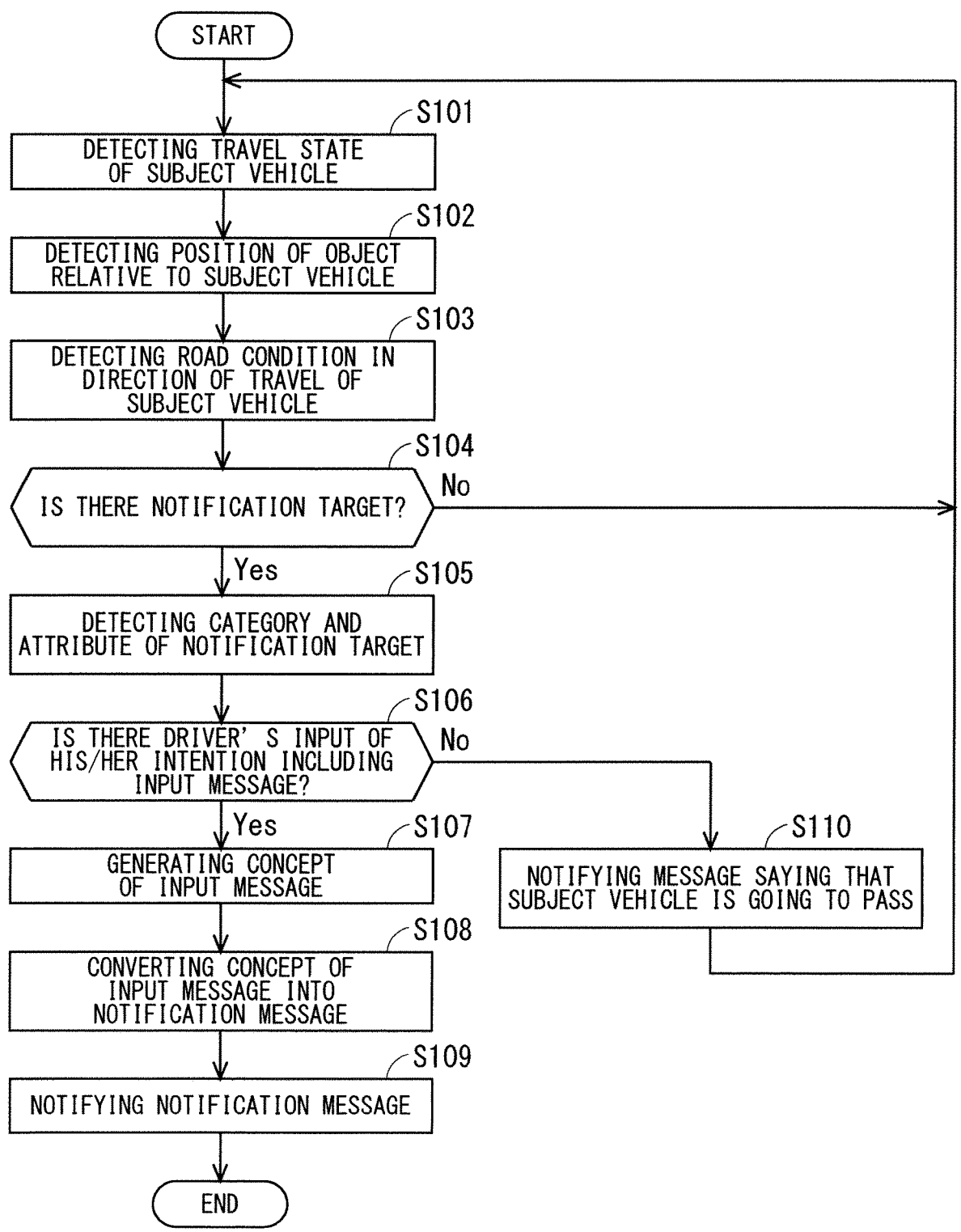
FIG. 4 is a flowchart showing one example of a process performed in the notification control apparatus according to the first embodiment of the present invention.

FIG. 4 is a flowchart showing one example of the process performed in the notification control apparatus 6.

In step S101, the travel state detecting unit 7 detects the travel state of the subject vehicle on the basis of information acquired from the vehicle control device 16. To be specific, the travel state detecting unit 7 detects, as the travel state, the speed of the subject vehicle, the direction of travel of the subject vehicle, and other things.

In step S102, the object position detecting unit 8 detects the position of the object relative to the subject vehicle on the basis of information acquired from the vehicle sensor 17. To be specific, the object position detecting unit 8 detects the position of the object relative to the subject vehicle on the basis of at least one of an image taken by a camera, the result of detection performed by a millimeter-wave radar, and the result of detection performed by an ultrasonic sensor.

In step S103, the road condition detecting unit 11 detects road conditions in the direction of travel of the subject vehicle. To be specific, the road condition detecting unit 11 acquires, from the map database 19, information about an intersection in the direction of travel of the subject vehicle, information about a crosswalk in the direction of travel of the subject vehicle, information about road shape, and other information items. Alternatively, the road condition detecting unit 11 acquires the information about the intersection, the information about the crosswalk, the information about the road shape, and other information items from outside via the communication unit 9 and the communication device 18.

In step S104, the determining unit 12 determines whether there is a notification target to be notified, which is the object, on the basis of the travel state detected by the travel state detecting unit 7 in step S101, the relative position of the object detected by the object position detecting unit 8 in step S102, and the road condition detected by the road condition detecting unit 11 in step S103. If there is a notification target, the process proceeds to step S105. If there is no notification target, the process returns to step S101.

For instance, the determining unit 12 determines that there is a notification target, when the object is near the intersection or the crosswalk. The determining unit 12 determines that there is no notification target, when the object that is relatively close to the subject vehicle is away from the road along which the subject vehicle is traveling, or when the subject vehicle, just before reaching the object, makes a right or left turn to travel a different road that does not bring the subject vehicle to the object. Further, whether there is a notification target may be determined by the determining unit 12, at a location more remote from the intersection when the subject vehicle travels at higher speed. That is, the location of a determination about whether there is a notification target, may rely on the speed of the subject vehicle.

In step S105, the category detector 10 detects the category of the notification target from an image taken by a camera, which is the vehicle sensor 17. In addition, the attribute detecting unit 2 detects the attribute of the notification target from the image, taken by the camera, which is the vehicle sensor 17.

In step S106, the determining unit 12 determines whether there is a driver's input of an intention including an input message. To be specific, when the input recognizing unit 3 recognizes an input message from the driver, the determining unit 12 determines that there is a driver's input of an intention. Here, the driver's input of the intention means the driver's input of his/her intention against the notification target. For instance, the driver inputs his/her intention by selecting any input message from a list of input messages displayed on the screen. Alternatively, the driver inputs his/her intention through voice by saying an input message. Alternatively, the driver inputs his/her intention by making a gesture indicating an input message. An example of such an input message for someone is a message saying "AFTER YOU". If there is a driver's input of an intention, the process proceeds to step S107. If there is no driver's input of an intention, the process proceeds to step S110.

In step S107, the message concept generating unit 13 generates the concept of the input message that is notified to the notification target, from the input message recognized by the input recognizing unit 3. For an input message saying "AFTER YOU" for instance, the message concept generating unit 13 generates the concept of the message saying "AFTER YOU" that is notified to the notification target.

In step S108, the message converting unit 4 converts the concept of the input message generated by the message concept generating unit 13 into a notification message indicating the same meaning as the input message, on the basis of at least one of the category detected by the category detector 10 and the attribute detected by the attribute detecting unit 2. For a child being the notification target for instance, the message converting unit 4 converts the concept of the input message into a notification message that is easy for the child to understand, such as a symbol indicating "AFTER YOU".

In step S109, the road projection controller 5 controls the road projector 21 to project the notification message converted by the message converting unit 4 onto at least part of a road located around the object. The road projector 21 projects the notification message onto at least part of the road located around the object under the control of the road projection controller 5. In addition, the audio-output controller 15 controls the audio-output device 22 to output the notification message converted by message converting unit 4, to the notification target by sound. The audio-output device 22 outputs the notification message to the notification target by sound under the control of the audio-output controller 15.

In step S110, the road projection controller 5 controls the road projector 21 to project a message saying that the subject vehicle is passing onto at least part of the road located around the object. The road projector 21 projects the message, saying that the subject vehicle is passing, onto at least part of the road located around the object under the control of the road projection controller 5. In addition, the audio-output controller 15 controls the audio-output device 22 to output a message saying that the subject vehicle is passing, to the notification target by sound. The audio-output device 22 outputs the message, saying that the subject vehicle is passing, to the notification target by sound under the control of the audio-output controller 15. The process returns to step S101 after step S110. It is noted that step S110 may include one of the projection of the message saying that the subject vehicle is passing onto the road and the audio output of the message saying that the subject vehicle is passing to the notification target. Alternatively, step S110 may include both. Here, an example of the message saying that the subject vehicle is passing, may be a message saying "VEHICLE PASSING"; for an audio output, the message may be output by honking the horn. It is also noted that the process may exclude the projection of the message saying that the subject vehicle is passing onto the road and exclude the audio output of the message saying that the subject vehicle is passing to the notification target.

In FIG. 4, step S105 may be executed before step S104. In this case, the determining unit 12 determines, in step S104, whether there is a notification target, on the basis of the attribute of the object as well. When a pedestrian is near the intersection or near the crosswalk for instance, the determining unit 12 determines that there is a notification target. The determining unit 12 determines that there is no notification target, when the pedestrian who is relatively close to the subject vehicle is away from a road along which the subject vehicle is traveling, or when the subject vehicle, just before reaching the pedestrian, makes a right or left turn to travel a different road that that does not bring the subject vehicle to the object.

The notification message, although automatically notified in step S109, may be notified by the driver at any timing. The determining unit 12 determines notification timing just before step S109. For instance, the driver may notify a notification message when seeing a notification target and uttering a sound indicating some kind of symbol. In this case, the input device 20 includes a camera that detects the sight line of the driver. Alternatively, the driver may notify a notification message when pointing at a notification target and uttering a sound indicating some kind of symbol.

Alternatively, the driver may notify the notification message when selecting a notification target that is detected by the vehicle sensor 17 and is displayed on the screen of a display (not shown). When the display has a touch panel for instance, the driver selects, with a touch, a notification target displayed on the screen of the display. At this time, the driver may notify a notification message when selecting the notification target and uttering a sound indicating some kind of symbol. It is noted that upon driver's selection of a notification target, the display may finish displaying the notification target.

In step S107, the message concept generating unit 13 may generate the concept of the input message when the driver makes a particular gesture, and utters any sound. The input recognizing unit 3 accordingly recognizes a gesture and sound indicating the input message.

In step S104, the driver may select one of a plurality of notification targets by making a particular gesture. The input recognizing unit 3 accordingly recognizes the gesture for selecting one of the notification targets. In addition, the message concept generating unit 13 may generate the concept of the input message, when the driver makes a gesture and utters any sound for selecting one of the notification targets. The road projection controller 5 accordingly controls projection of the notification message onto at least part of the road located around the notification target as identified through the gesture.

In step 109, the road projection controller 5 may control projection of the notification message in animation form onto the road. For a request asking a notification target to cross the road for instance, the road projection controller 5 may control projection of an animated message onto the road, just like the arrow in FIG. 6 sequentially displayed toward the direction of indication. The details will be described later on.

Alternatively, the road projection controller 5 may control projection of the notification message in blinking form onto the road.

EXAMPLES OF NOTIFICATION

The following describes first to third examples of notification to the notification target in step S109 in FIG. 4.

First Example

The first example describes an instance where the category detector 10 detects a category indicating human being and where the attribute detecting unit 2 detects an attribute indicating the age of a human being.

Figure 5:
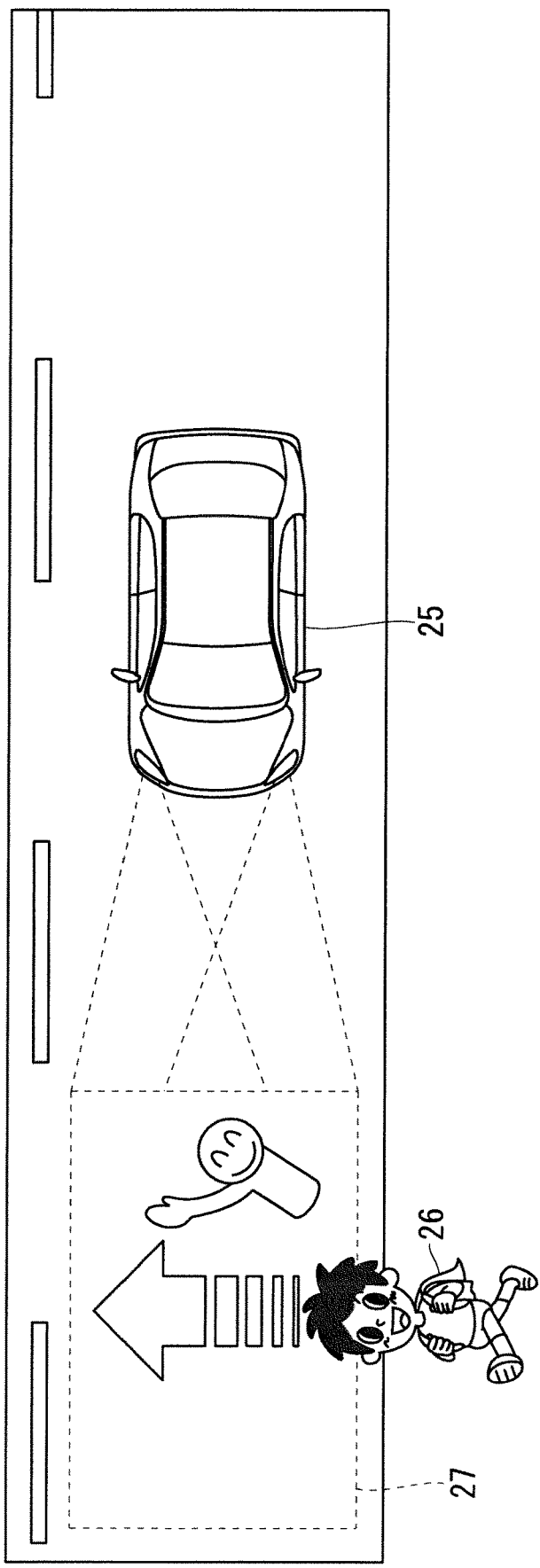
FIG. 5 is a diagram illustrating one example of notification in the first embodiment of the present invention.

FIG. 5 is a diagram illustrating how to notify a child 26 who is located in the direction of travel of a subject vehicle 25. As illustrated in FIG. 5, in which the notification target is the child 26, the message converting unit 4 converts the concept of the input message generated by the message concept generating unit 13 into a notification message 27 saying "AFTER YOU" in the form of a symbol. Under the control of the road projection controller 5, the road projector 21 projects the notification message 27 onto a road that is located around the child 26 and along which the subject vehicle 25 is traveling. The child 26 accordingly understands that he/she may cross the road.

Figure 6:
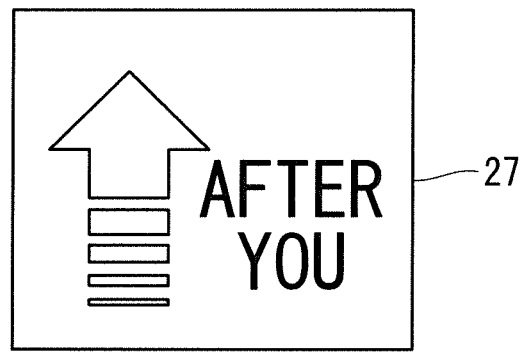
FIG. 6 is a diagram illustrating one example of the notification in the first embodiment of the present invention.
Figure 7:
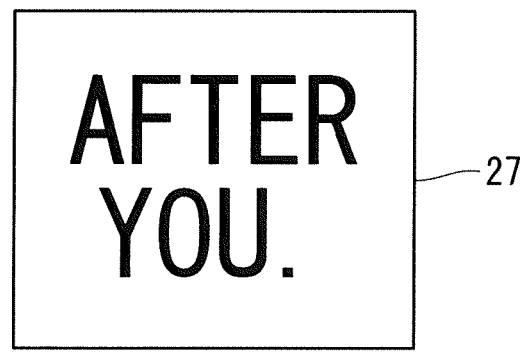
FIG. 7 is a diagram illustrating one example of the notification in the first embodiment of the present invention.

For an adult being the notification target, the message converting unit 4 may convert the concept of the input message generated by the message concept generating unit 13 into the notification message 27 shown in FIG. 6. For an elderly person being the notification target, the message converting unit 4 may convert the concept of the input message generated by the message concept generating unit 13 into the notification message 27 shown in FIG. 7.

Figure 8:
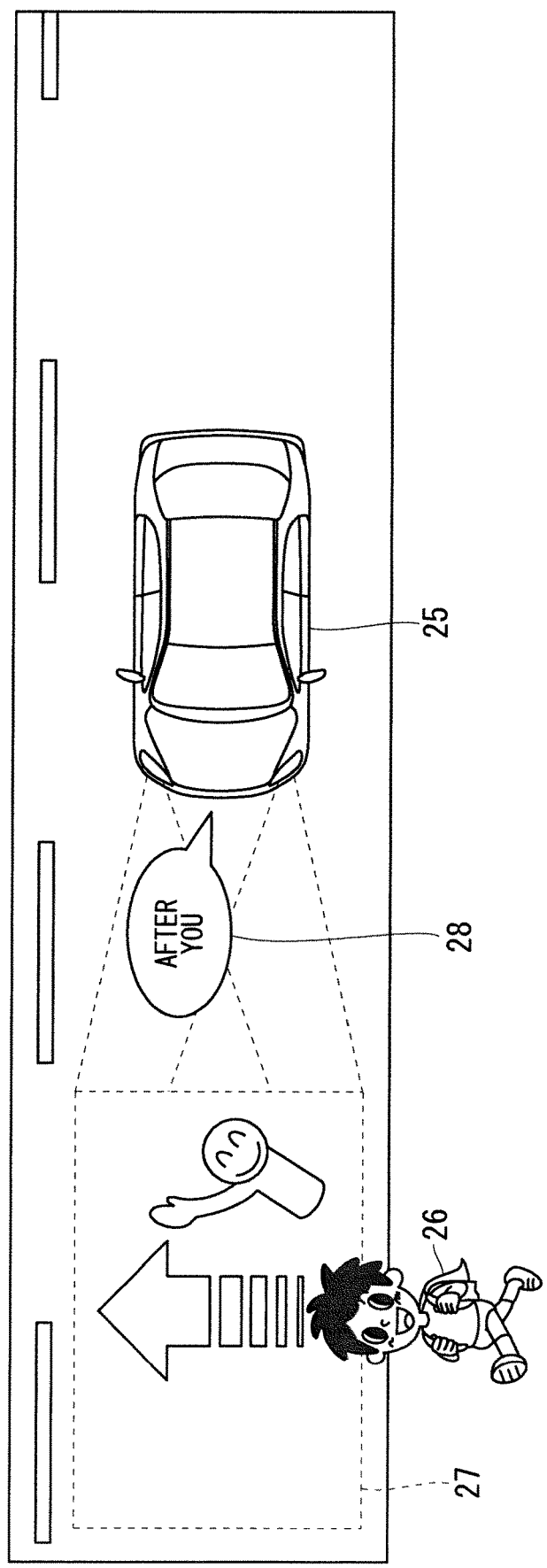
FIG. 8 is a diagram illustrating one example of the notification in the first embodiment of the present invention.

As illustrated in FIG. 8, in which the notification target is the child 26, the message converting unit 4 may convert the concept of the input message generated by the message concept generating unit 13 into the notification message 27 saying "AFTER YOU" in the form of a symbol and into a notification message 28 saying "AFTER YOU" in the form of a voice. Under the control of the road projection controller 5, the road projector 21 accordingly projects the notification message 27 onto the road that is located around the child 26 and along which the subject vehicle 25 is traveling. In addition, the audio-output device 22 outputs the notification message 28 to the child 26 by sound under the control of the audio-output controller 15.

Although FIG. 8 illustrates that the notification message 28 is notified to the child 26 by sound, the notification message 27 and the notification message 28 may be notified to an adult and an elderly person.

Second Example

The second example describes an instance where the category detector 10 detects a category indicating human being, and the attribute detecting unit 2 detects an attribute indicating physical feature of a human being.

Figure 9:
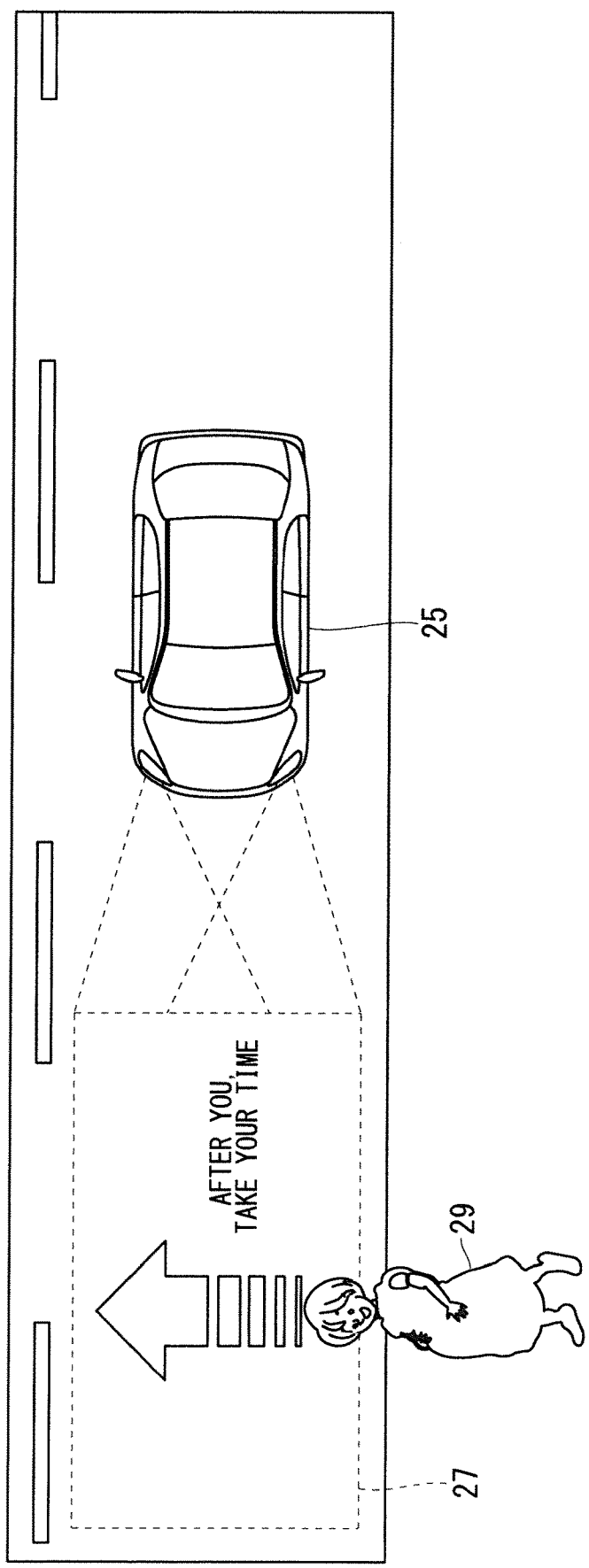
FIG. 9 is a diagram illustrating one example of the notification in the first embodiment of the present invention.

FIG. 9 is a diagram illustrating how to notify an expectant mother 29 who is located in the direction of travel of the subject vehicle 25. As illustrated in FIG. 9, in which the notification target is the expectant mother 29, the message converting unit 4 converts the concept of the input message generated by the message concept generating unit 13 into the notification message 27 saying "AFTER YOU, TAKE YOUR TIME" in the form of characters and a symbol. Under the control of the road projection controller 5, the road projector 21 projects the notification message 27 onto a road that is located around the expectant mother 29 and along which the subject vehicle 25 is traveling. The expectant mother 29 accordingly understands that she may cross the road. A video image taken by a camera, which is the vehicle sensor 17, may be used to detect the expectant mother 29. Alternatively, a portable communication terminal carried with the expectant mother 29 may be used to acquire information that she is an expectant mother via the communication unit 9 and the communication device 18.

Figure 10:
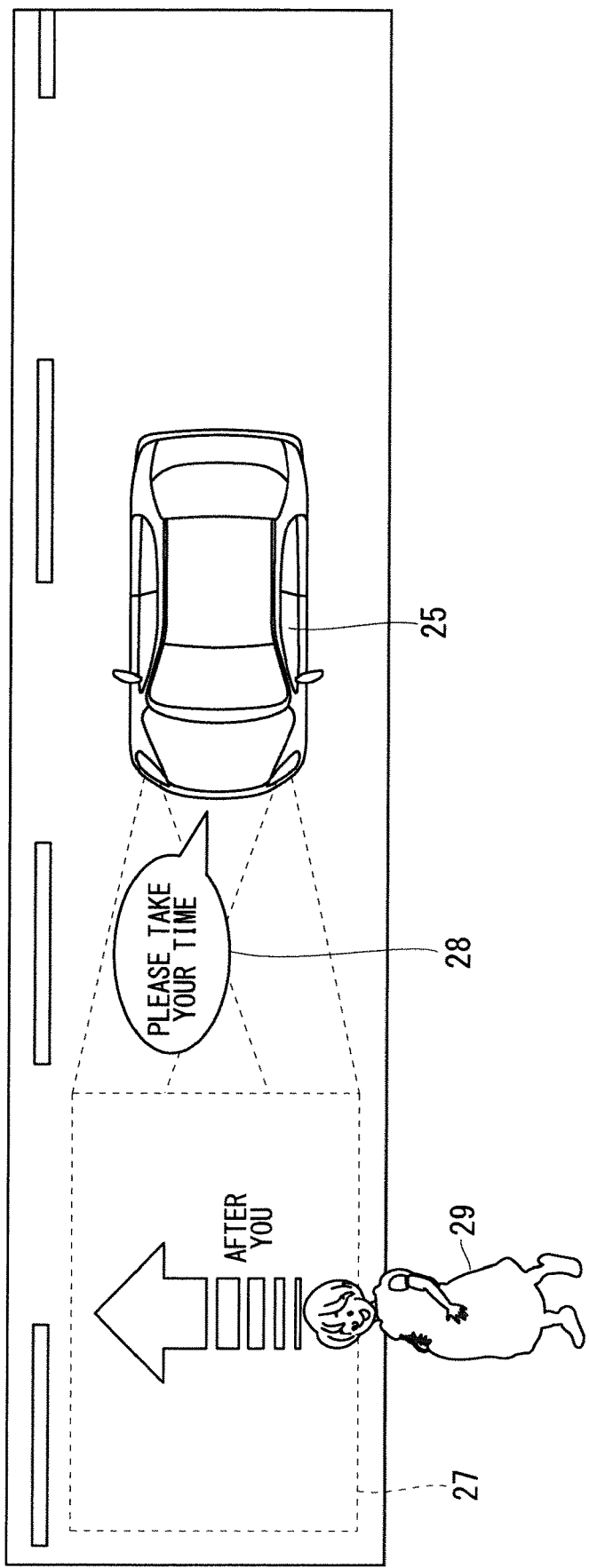
FIG. 10 is a diagram illustrating one example of the notification in the first embodiment of the present invention.

As illustrated in FIG. 10, in which the notification target is the expectant mother 29, the message converting unit 4 may convert the concept of the input message generated by the message concept generating unit 13 into the notification message 27 saying "AFTER YOU" in the form of characters and a symbol and into the audio notification message 28 saying "PLEASE TAKE YOUR TIME".

FIGS. 9 and 10 illustrate, but not limited to, that the notification target is the expectant mother 29. The notification target may be a wounded person or a person in a wheel chair.

Third Example

The third example describes an instance where the category detector 10 detects a category indicating animal.

Figure 11:
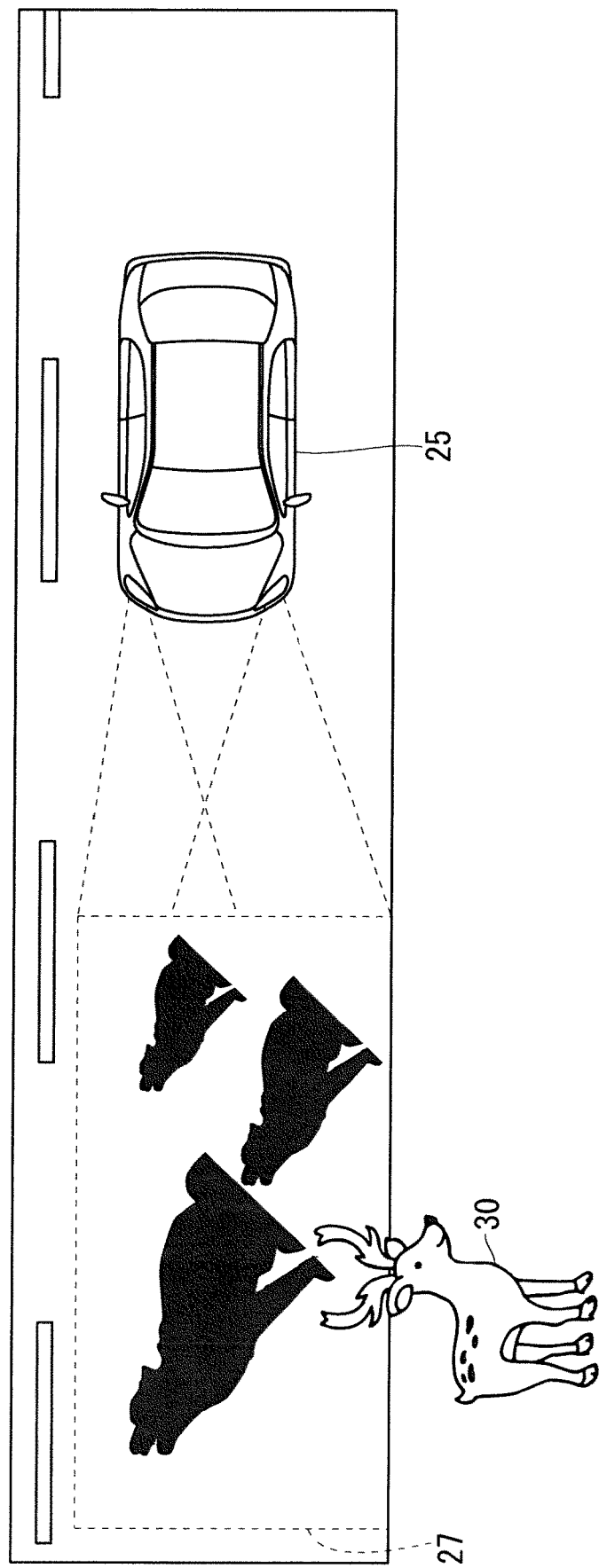
FIG. 11 is a diagram illustrating one example of the notification in the first embodiment of the present invention.

FIG. 11 is a diagram illustrating how to notify an animal 30 located in the direction of travel of the subject vehicle 25. As illustrated in FIG. 11, in which the notification target is the animal 30, the message converting unit 4 converts the concept of the input message generated by the message concept generating unit 13 into the notification message 27 giving a warning to prevent the animal 30 from entry to a road. Under the control of the road projection controller 5, the road projector 21 projects the notification message 27 onto the road that is located around the animal 30 and along which the subject vehicle 25 is traveling. Along with the notification message 27, the audio-output device 22 may output a sound warning the animal 30. The animal 30 can be thus warned.

For a moose being the animal 30, the notification message 27 may be a silhouette of a wolf. The notification message 27 may blink. The crying sound of a wolf may be emitted along with the notification message 27. The audio-output device 22 may be a directional speaker in this case.

Different notifications may be made in accordance with the attribute of the animal 30. When the attribute indicates the size of the animal 30 for instance, the smaller the animal 30 is, the higher the basic frequency of a sound from the audio-output device 22 may be. Further, the audio-output device 22 may output an ultrasonic wave to the animal 30 when having such a function. Still further, when the animal 30 is a herbivore, the audio-output device 22 may output a sound of its natural enemy, such as a bark of a carnivore.

As described above, the notification control apparatus according to the first embodiment notifies the notification target of the notification message in accordance with at least the attribute of the notification target. The notification control apparatus thus makes a notification suitable for the notification target. That is, the notification control apparatus improves the accuracy of display to the notification target.

Second Embodiment

A second embodiment of the present invention describes an instance where the category detector 10 detects a category indicating human being and where the attribute detecting unit 2 detects an attribute indicating face orientation. A notification control apparatus according to the second embodiment, which is similar to the notification control apparatus 6 in FIG. 2, will not be elaborated upon. The following description equates the notification control apparatus according to the second embodiment with the notification control apparatus 6 illustrated in FIG. 2.

A process performed in the notification control apparatus 6 according to the second embodiment is basically the same as that shown in FIG. 4. Characteristic process steps in the second embodiment will be focused on with reference to FIG. 4.

In step S105, the attribute detecting unit 2 detects the orientation of the face of a person who is a notification target, from an image taken by a camera, which is the vehicle sensor 17.

In step S108, the message converting unit 4 converts the concept of an input message generated by the message concept generating unit 13 into a notification message on the basis of the orientation of the face of the notification target detected by the attribute detecting unit 2. To be specific, the message converting unit 4 changes the orientation of the notification message in accordance with the orientation of the face of the notification target so that the notification target can easily understand what the message is saying.

The message converting unit 4 also converts the concept of the input message into a notification message in accordance with the orientation of the face of the notification target. When the subject vehicle is approaching from the right of the notification target for instance, the message converting unit 4 converts the concept of the input message into a notification message "WATCH OUT FOR RIGHT!" indicating that the subject vehicle is approaching from the right. In this case, the driver of the subject vehicle has already input an input message that cautions the notification target.

In step S109, the road projection controller 5 controls the road projector 21 to project the notification message converted by the message converting unit 4 onto a location toward which the face of the notification target is oriented. Under the control of the road projection controller 5, the road projector 21 projects the notification message onto the location toward which the face of the notification target is oriented.

Figure 12:
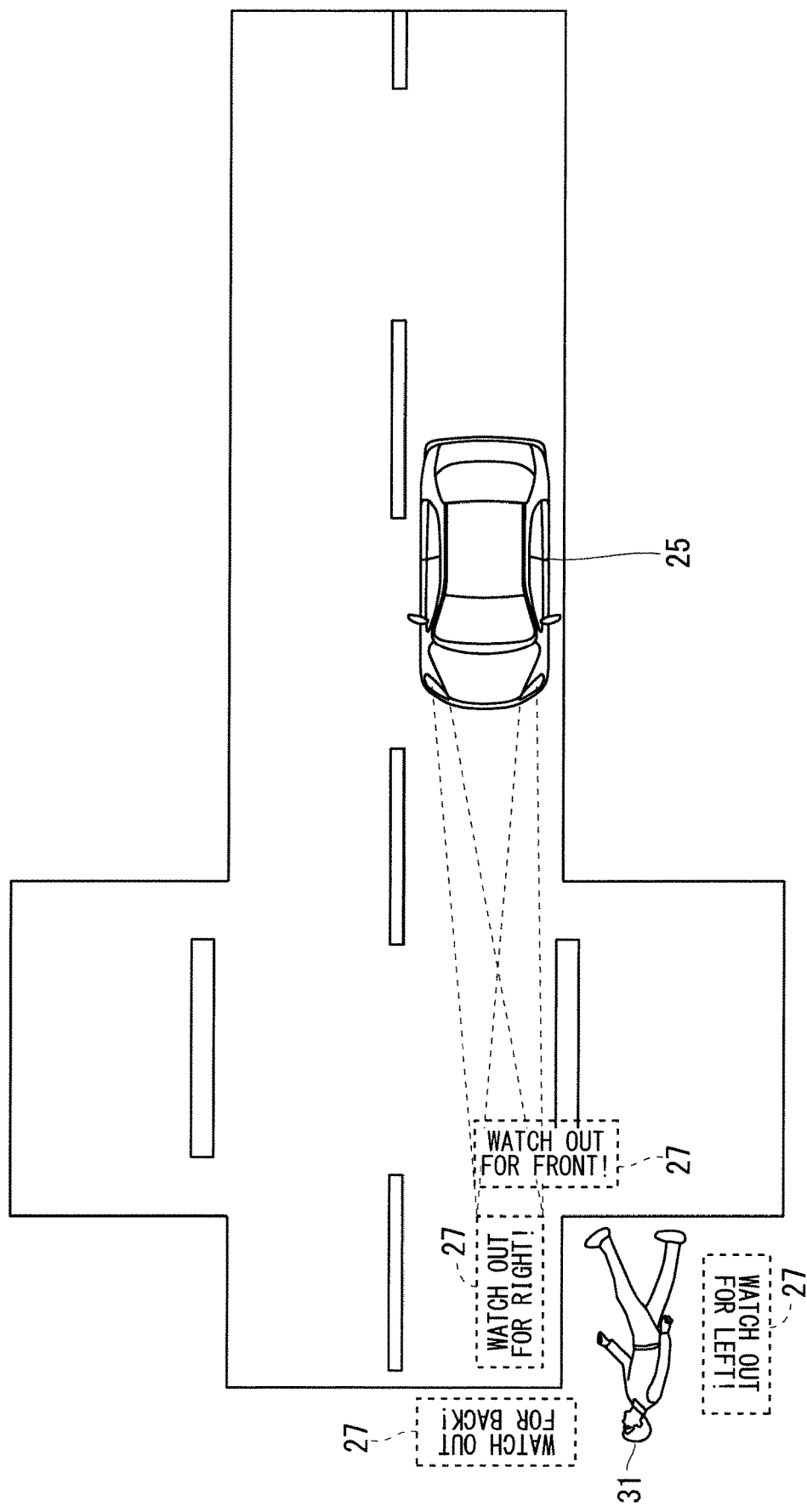
FIG. 12 is a diagram illustrating one example of notification in a second embodiment of the present invention.

FIG. 12 is a diagram illustrating how to notify an adult 31 who is located at an intersection in the direction of travel of the subject vehicle 25. As illustrated in FIG. 12, when the adult 31 orients his/her face toward a road along which the subject vehicle 25 travels, the road projector 21 projects the notification message 27 saying "WATCH OUT FOR RIGHT!" onto the road. When the adult 31 orients his/her face toward the subject vehicle 25, the road projector 21 projects the notification message 27 saying "WATCH OUT FOR FRONT!" onto the road. When the adult 31 orients his/her face opposite the road along which the subject vehicle 25 travels, the road projector 21 projects the notification message 27 saying "WATCH OUT FOR LEFT!" onto the road. When the adult 31 orients his/her face toward the direction of travel of the subject vehicle, the road projector 21 projects the notification message 27 saying "WATCH OUT FOR BACK!" onto the road.

Although FIG. 12 shows, for description, four kinds of notification message 27 projected around the adult 31, who is the notification target, the notification message 27 needs to be projected at only a location toward which the adult 31 orients his/her face. As a matter of course, the notification messages 27 may be projected around the adult 31.

Figure 13:
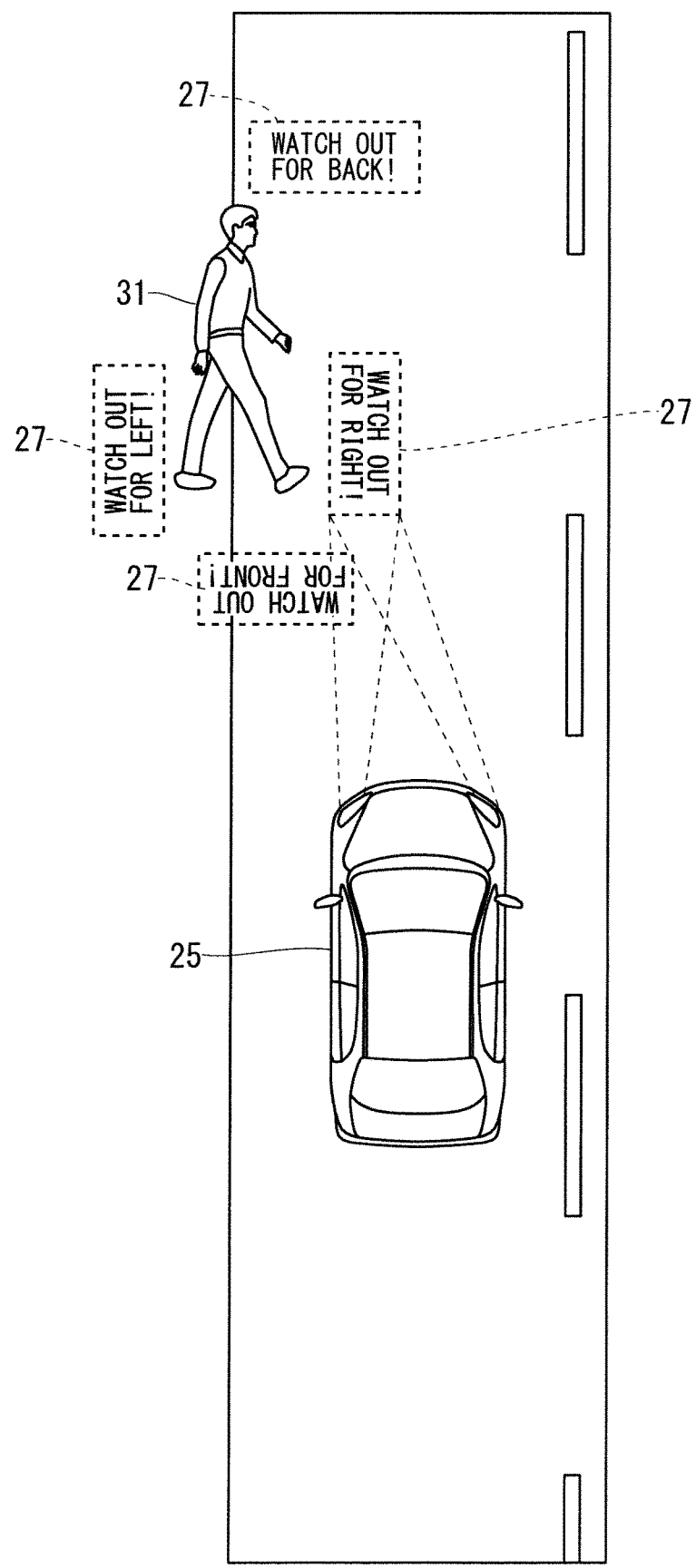
FIG. 13 is a diagram illustrating one example of the notification in the second embodiment of the present invention.

FIG. 13 is a diagram illustrating how to notify the adult 31 who is located in a road without an intersection. The notification in FIG. 12 is applied to the example in FIG. 13.

When determining that there is a notification target in step S104, the determining unit 12 may estimate a direction in which the notification target will move, on the basis of a change in the orientation of the face of the notification target detected by the attribute detecting unit 2, a change in the position of the notification target relative to the subject vehicle detected by the object position detecting unit 8, and the road condition detected by the road condition detecting unit 11. For a pedestrian waking toward a road along which the subject vehicle is traveling, for instance, the determining unit 12 estimates that the pedestrian will cross the road.

Figure 14:
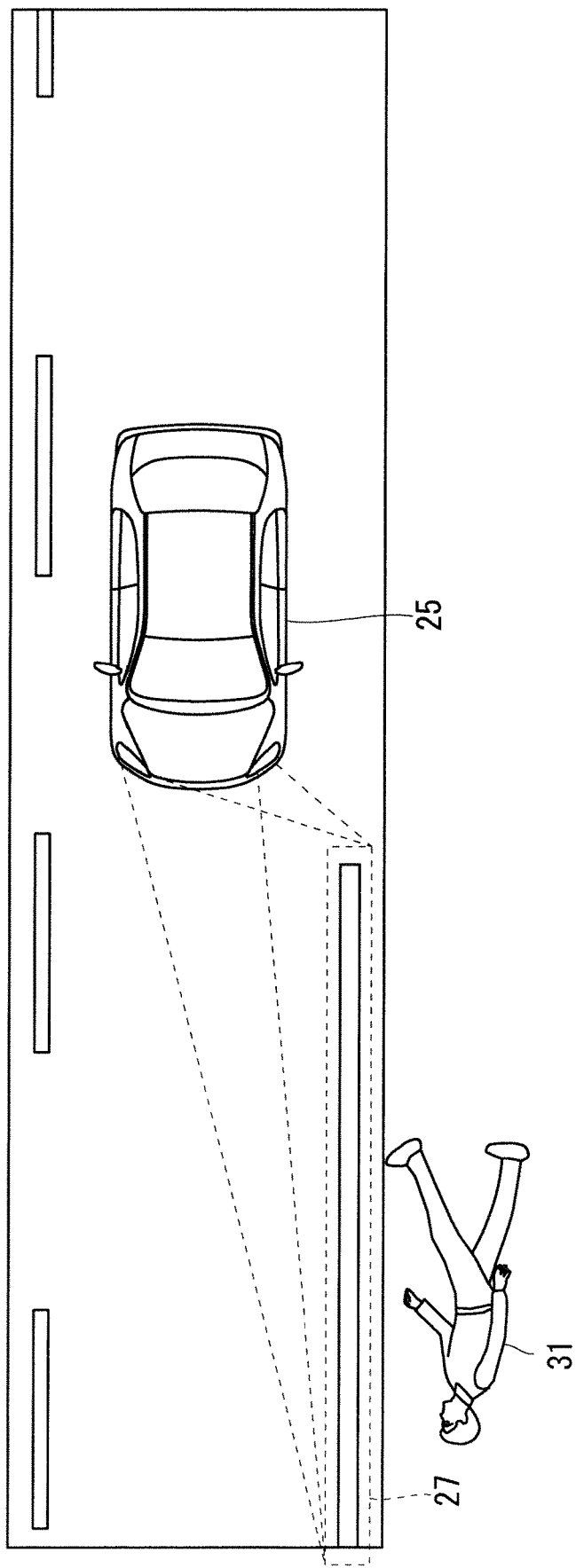
FIG. 14 is a diagram illustrating one example of the notification in the second embodiment of the present invention.

To be specific, FIG. 14 shows that the message converting unit 4 converts the concept of the input message generated by the message concept generating unit 13 into the notification message 27 in the form of a line drawing. The message converting unit 4 performs this conversion when the determining unit 12 determines that the adult 31, who is the notification target, is near the road along which the subject vehicle 25 is traveling. That is, the message converting unit 4 performs this conversion when the determining unit 12 determines that there is a notification target within a range that is predetermined from a travel route of the subject vehicle 25. The input message in this case is a message saying that the subject vehicle 25 is approaching near the adult 31. The road projection controller 5 then controls projection of the notification message 27 in the form of a line drawing between the subject vehicle 25 and the adult 31. The road projector 21 accordingly projects the notification message 27 in the form of a line drawing between the subject vehicle 25 and the adult 31.

Figure 15:
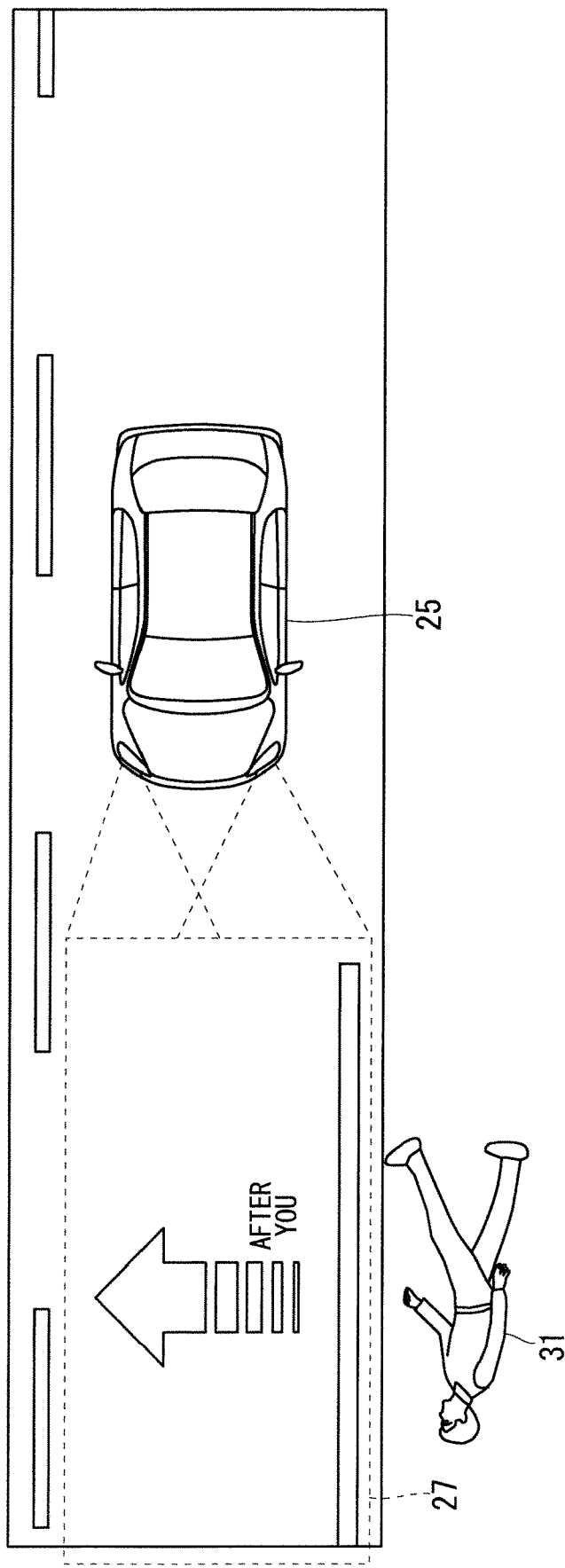
FIG. 15 is a diagram illustrating one example of the notification in the second embodiment of the present invention.

As illustrated in FIG. 15, the message converting unit 4 converts the concept of the input message generated by the message concept generating unit 13 into the notification message 27 formed of a message and a symbol that say "AFTER YOU", and of a line drawing. The message converting unit 4 performs this conversion when the determining unit 12 estimates that the adult 31 will move toward the road along which the subject vehicle 25 is traveling. The road projection controller 5 then controls projection of the message and the symbol saying "AFTER YOU" in front of the adult 31, and projection of the line drawing between the subject vehicle 25 and the adult 31. The road projector 21 accordingly projects the message and the symbol saying "AFTER YOU" in front of the adult 31, and projects the line drawing between the subject vehicle 25 and the adult 31.

Figure 16:
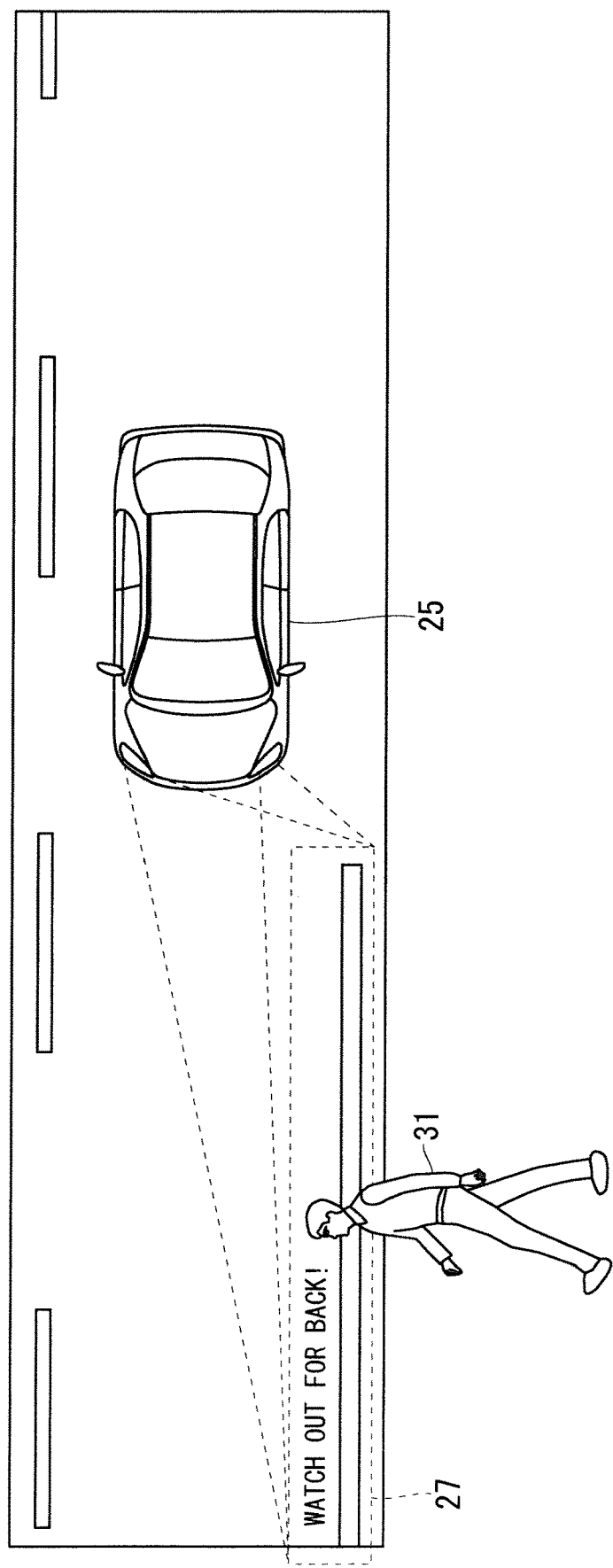
FIG. 16 is a diagram illustrating one example of the notification in the second embodiment of the present invention.

When the determining unit 12 determines that the adult 31, who is the notification target, is near the road along which the subject vehicle 25 is traveling, the message converting unit 4 may convert the input message generated by the message concept generating unit 13 into the notification message 27 in the form of a line drawing. As illustrated in FIG. 16 for instance, the road projector 21 accordingly projects a message saying "WATCH OUT FOR BACK!" in front of the adult 31, and projects a line drawing between the subject vehicle 25 and the adult 31.

As described above, the notification control apparatus according to the second embodiment notifies the notification message in accordance with the orientation of the face of the notification target. The notification control apparatus thus allows the driver to convey his/her intention to the notification target with more certainty. That is, the notification control apparatus according to the second embodiment achieves display to the notification target with higher accuracy than the notification control apparatus according to the first embodiment.

Third Embodiment

A third embodiment of the present invention describes an instance where the category detector 10 detects a category indicating human being and where the attribute detecting unit 2 detects an attribute indicating language information. A notification control apparatus according to the third embodiment, which is similar to the notification control apparatus 6 in FIG. 2, will not be elaborated upon. The following description equates the notification control apparatus according to the third embodiment with the notification control apparatus 6 illustrated in FIG. 2.

A process performed in the notification control apparatus 6 according to the third embodiment is basically the same as that shown in FIG. 4. Characteristic process steps in the third embodiment will be focused on with reference to FIG. 4.

In step S105, the communication unit 9 acquires language information that is set in a portable communication terminal carried with a person who is a notification target, from the portable communication terminal via the communication device 18. The attribute detecting unit 2 detects language information acquired by the communication unit 9, as the attribute of the notification target.

In step S108, the message converting unit 4 converts the concept of an input message generated by the message concept generating unit 13 into a notification message on the basis of the language information detected by the attribute detecting unit 2. In step S109, the road projection controller 5 controls the road projector 21 to project the notification message converted by the message converting unit 4 onto at least part of a road located around an object. The road projector 21 projects the notification message onto at least part of the road located around the object under the control of the road projection controller 5.

Figure 17:
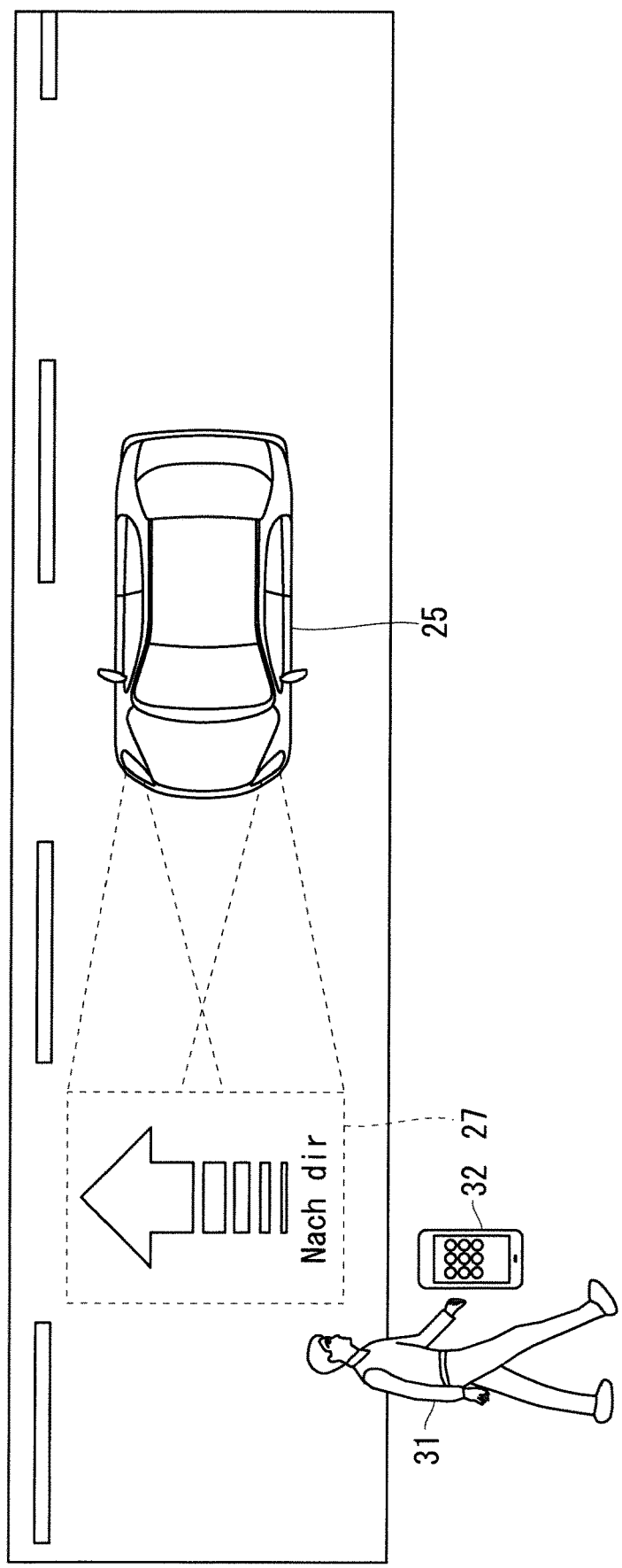
FIG. 17 is a diagram illustrating one example of notification in a third embodiment of the present invention.

FIG. 17 illustrates an instance where the adult 31 is located in the direction of travel of the subject vehicle 25. The attribute detecting unit 2 acquires the language information from a portable communication terminal 32 carried with the adult 31. For the language information being German, the message converting unit 4 then converts the concept of the input message generated by the message concept generating unit 13 into a German notification message. Under the control of the road projection controller 5, the road projector 21 projects the notification message 27 onto a road that is located around the notification target and along which the subject vehicle 25 is traveling. At this time, the audio-output device 22 may output the German notification message by sound.

As described above, the notification control apparatus according to the third embodiment notifies the notification message in accordance with the language information used by the notification target. The notification control apparatus thus allows the driver to convey his/her intention with more certainty. That is, the notification control apparatus according to the third embodiment achieves display to the notification target with higher accuracy than the notification control apparatus according to the first embodiment.

Fourth Embodiment

<Configuration>

Figure 18:
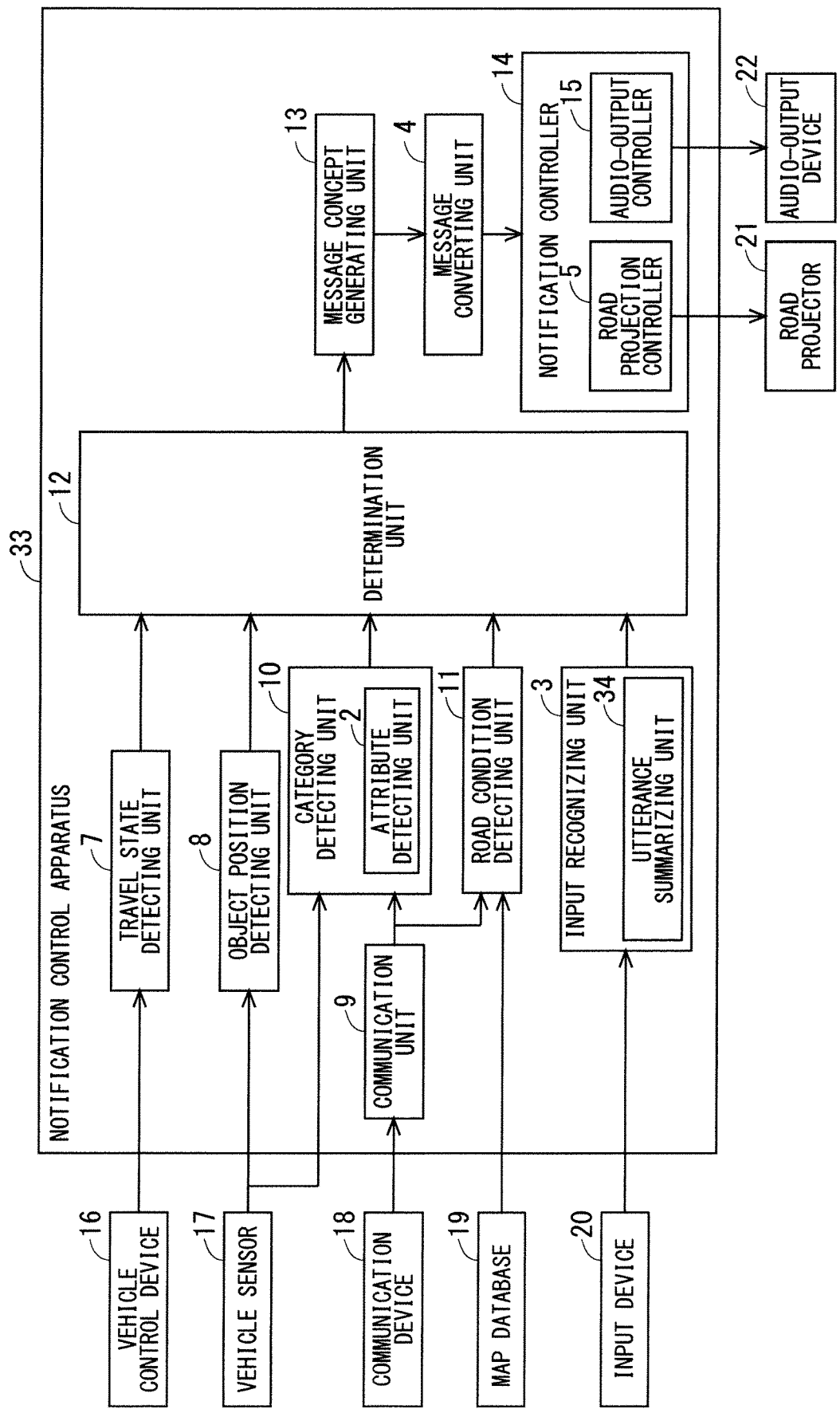
FIG. 18 is a block diagram illustrating one example of the configuration of a notification control apparatus according to a fourth embodiment of the present invention.

FIG. 18 is a block diagram illustrating one example of the configuration of a notification control apparatus 33 according to a fourth embodiment of the present invention.

As illustrated in FIG. 18, the notification control apparatus 33 includes an utterance summarizing unit 34. The other components, which are similar to those in the first embodiment, will not be elaborated upon.

The utterance summarizing unit 34 summarizes a driver's utterance via the input device 20 to form an input message. Summarizing the utterance herein means eliminating unnecessary phrases, but leaving the meaning of the driver's utterance as it is.

A processing circuit implements the function of the utterance summarizing unit 34 of the notification control apparatus 33. That is, the notification control apparatus 33 includes a processing circuit for summarizing a driver's utterance to form an input message. The processing circuit is the processor 23 that executes a program stored in the memory 24 as illustrated in FIG. 3. The other functions of the notification control apparatus 33 are similar to those of the notification control apparatus according to the first embodiment.

Software, firmware, or a combination of software and firmware implements the function of the utterance summarizing unit 34 of the notification control apparatus 33. As illustrated in FIG. 3, the software or firmware is written as a program and stored in the memory 24. The processing circuit reads and executes the program, stored in the memory 24, to implement the function of the utterance summarizing unit 34. That is, the notification control apparatus 33 includes the memory 24 for storing a program that executes a process step of summarizing a driver's utterance to form an input message. This program is for controlling a computer to execute the procedure or method of the utterance summarizing unit 34. The other functions of the notification control apparatus 33 are similar to those of the notification control apparatus according to the first embodiment.

<Operation>

A process performed in the notification control apparatus 33 according to the fourth embodiment is basically the same as that shown in FIG. 4. A characteristic process step in the fourth embodiment will be focused on with reference to FIG. 4.

In step S106, when the input recognizing unit 3 recognizes a driver's utterance including an input message, the determining unit 12 determines that there is a driver's input of an intention. At this time, the utterance summarizing unit 34 summarizes the driver's utterance to form the input message. The subsequent process steps are similar to those described in the first embodiment.

As described above, the notification control apparatus according to the fourth embodiment summarizes the driver's utterance to form the input message. The notification control apparatus thus allows the driver to convey his/her intention with more certainty. That is, the notification control apparatus according to the fourth embodiment achieves display to the notification target with higher accuracy than the notification control apparatus according to the first embodiment.

Fifth Embodiment

<Configuration>

Figure 19:
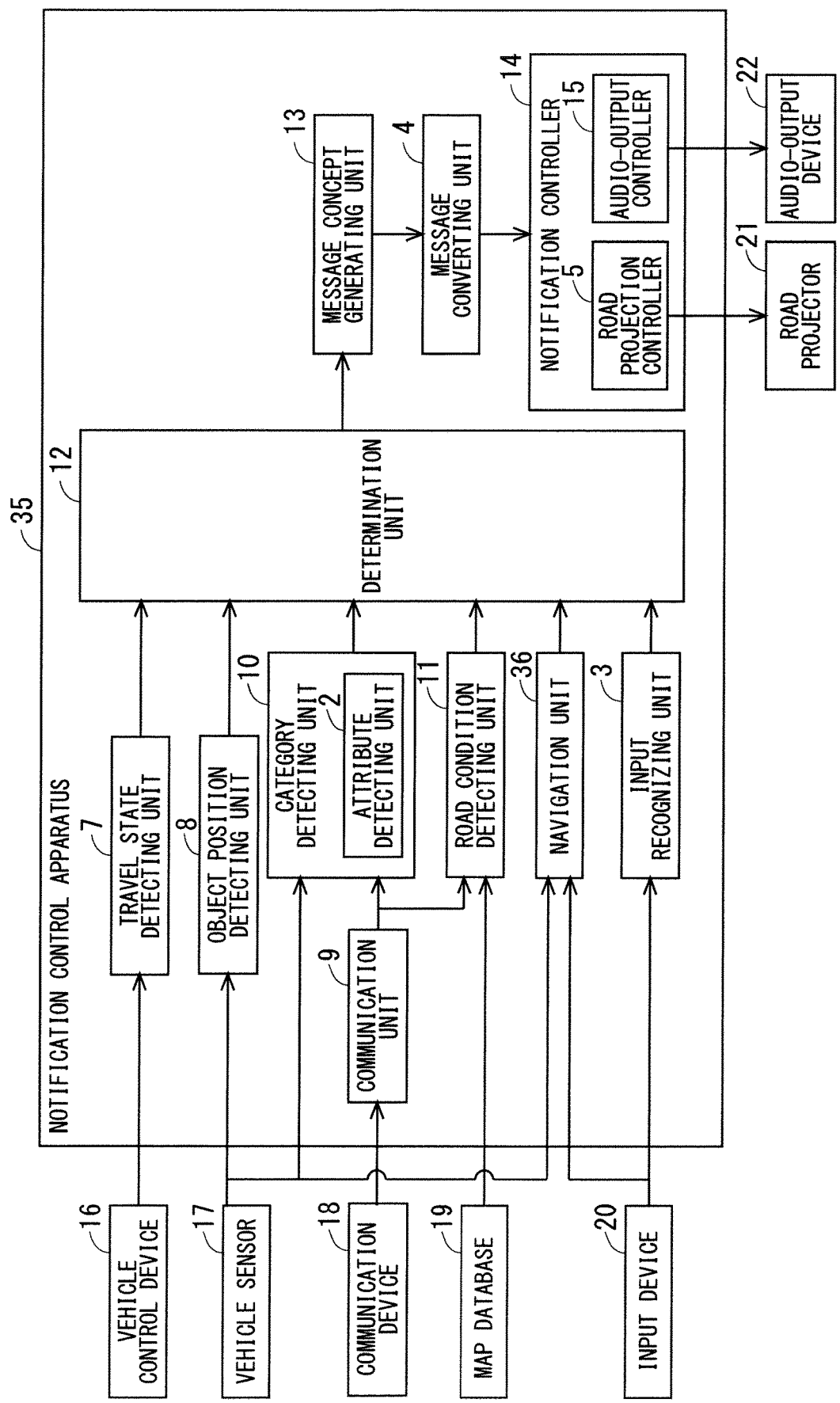
FIG. 19 is a block diagram illustrating one example of the configuration of a notification control apparatus according to a fifth embodiment of the present invention.

FIG. 19 is a block diagram illustrating one example of the configuration of a notification control apparatus 35 according to a fifth embodiment of the present invention.

As illustrated in FIG. 19, the notification control apparatus 35 includes a navigation unit 36. The other components, which are similar to those in the first embodiment, will not be elaborated upon.

The navigation unit 36 calculates a route from the current position of a subject vehicle to a destination. The destination can be set by the driver or the other people via the input device 20.

A processing circuit implements the function of the navigation unit 36 of the notification control apparatus 35. That is, the notification control apparatus 35 includes a processing circuit for calculating a route from the current position of a subject vehicle to a destination. The processing circuit is the processor 23 that executes a program stored in the memory 24 as illustrated in FIG. 3. The other functions of the notification control apparatus 35 are similar to those of the notification control apparatus according to the first embodiment.

Software, firmware, or a combination of software and firmware implements the function of the navigation unit 36 of the notification control apparatus 35. As illustrated in FIG. 3, the software or firmware is written as a program and stored in the memory 24. The processing circuit reads and executes the program, stored in the memory 24, to implement the function of the navigation unit 36. That is, the notification control apparatus 35 includes the memory 24 for storing a program that executes a process step of calculating a route from the current position of the subject vehicle to a destination. This program is for controlling a computer to execute the procedure of method of the navigation unit 36. The other functions of the notification control apparatus 35 are similar to those of the notification control apparatus according to the first embodiment.

<Operation>

Figure 20:
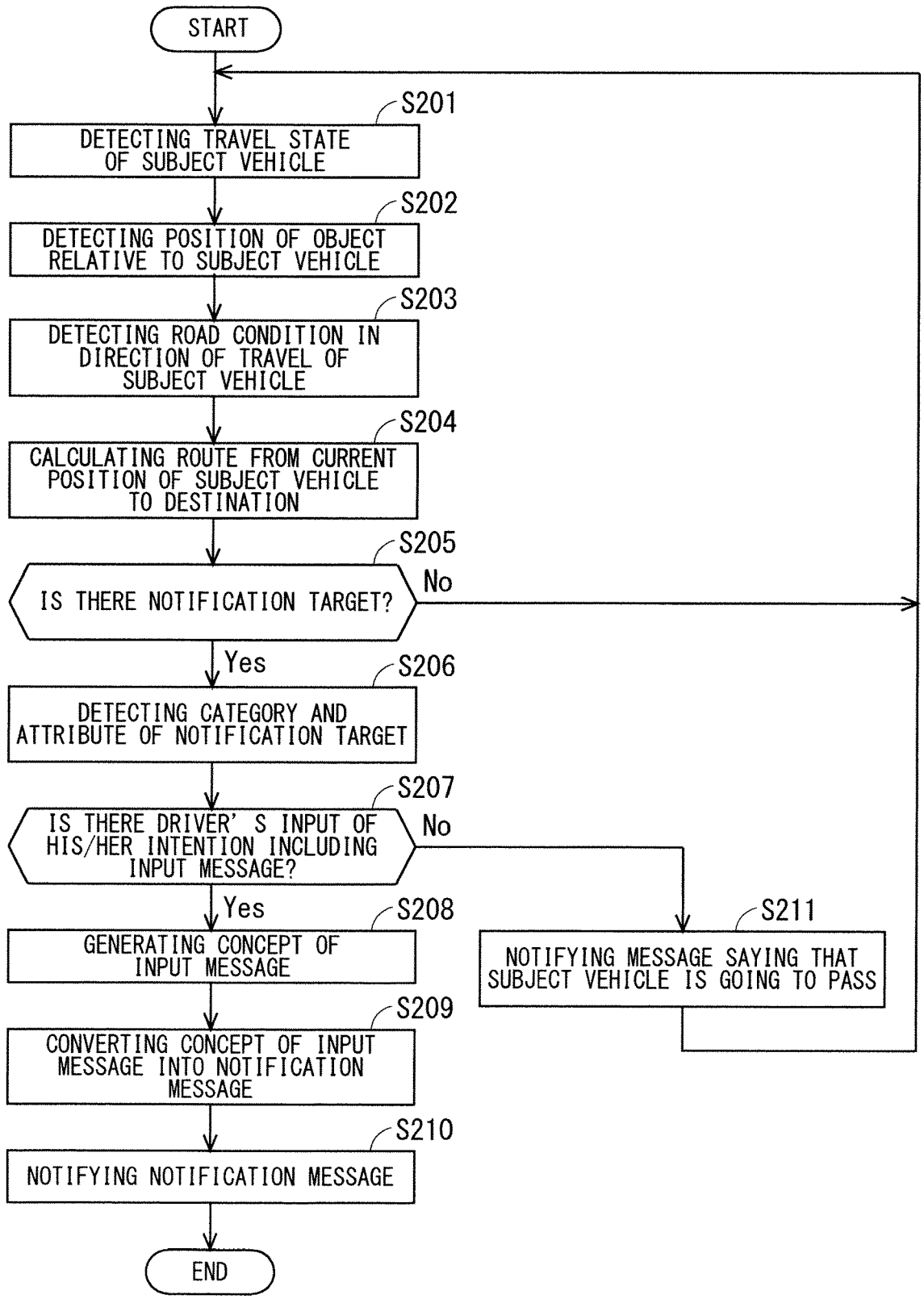
FIG. 20 is a flowchart showing one example of a process performed in the notification control apparatus according to the fifth embodiment of the present invention.

FIG. 20 is a flowchart showing one example of a process performed in the notification control apparatus 35. Steps S201 to S203 and steps S206 to S211 in FIG. 20, which respectively correspond to steps S101 to S103 and steps S105 to S110 in FIG. 4, will not be elaborated upon. Steps S204 and S205 will be described.

In step S204, the navigation unit 36 calculates a route from the current position of the subject vehicle to a destination. To be specific, the navigation unit 36 calculates a route from the current position of the subject vehicle that is acquired from a GPS installed in the vehicle sensor 17, to a destination that is set by the driver or the other people via the input device 20.

In step S205, the determining unit 12 determines whether there is a notification target on the basis of the travel state detected by the travel state detecting unit 7 in step S201, the relative position of the object detected by the object position detecting unit 8 in step S202, the road condition detected by the road condition detecting unit 11 in step S203, and the route calculated by the navigation unit 36 in step S204. If there is a notification target, the process proceeds to step S206. If there is no notification target, the process returns to step S201.

Figure 21:
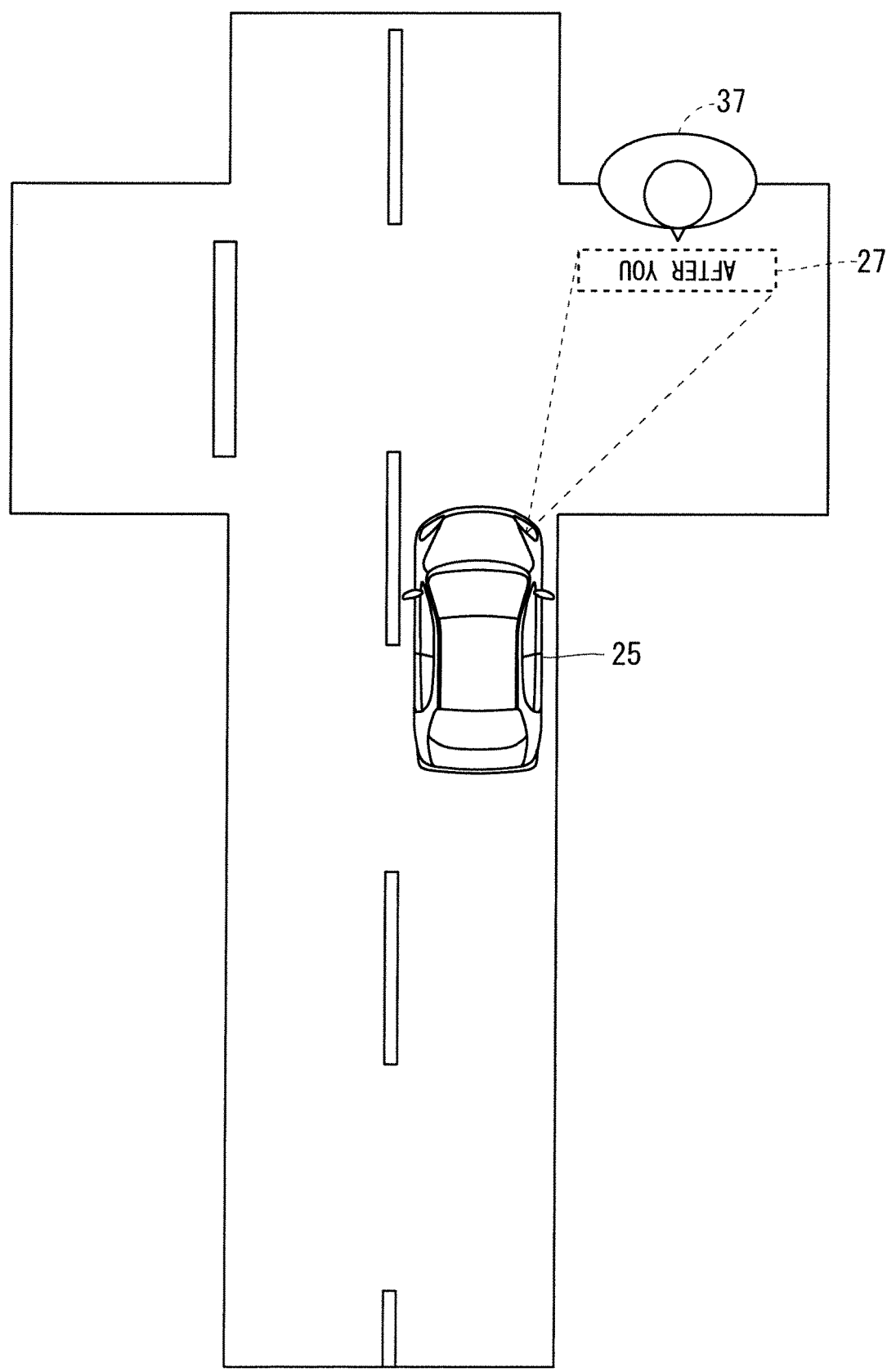
FIG. 21 is a diagram illustrating one example of notification in the fifth embodiment of the present invention.

FIG. 21 illustrates an instance where the subject vehicle 25 is going to make a right turn at an intersection in accordance with the route calculated by the navigation unit 36. The road projection controller 5 makes a notification suitable for a pedestrian 37, who is located near the route.

As described above, the notification control apparatus according to the fifth embodiment reflects the route calculated by the navigation unit 36. The notification control apparatus thus allows the driver to convey his/her intention with more certainty. That is, the notification control apparatus according to the fifth embodiment achieves display to the notification target with higher accuracy than the notification control apparatus according to the first embodiment.

The aforementioned notification control apparatuses each can be included not only in a vehicle-mounted navigation device (i.e., a car navigation device), but also in a navigation device formed as a system in appropriate combination with a vehicle-mountable portable navigation device (PND), an external server, and other things. Alternatively, the display control apparatuses each can be included in a device other than such a navigation device. In this case, the functions or components of each notification control apparatus are distributed, for placement, to respective functions that constitute the above system.

Figure 22:
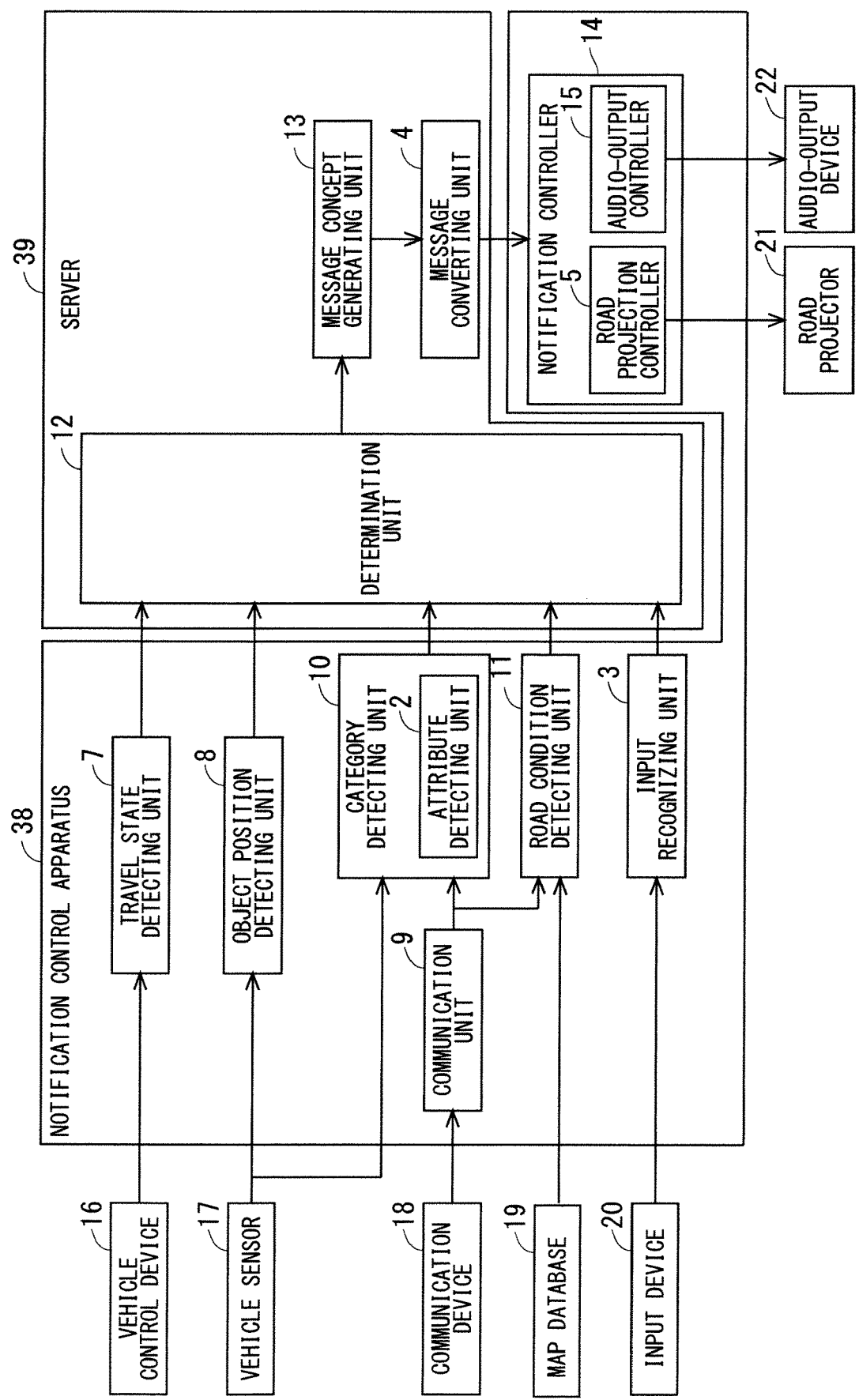
FIG. 22 is a block diagram illustrating one example of the configuration of a notification control system according to the embodiments of the present invention.

To be specific, the functions of the notification control apparatus can be placed on a server, for instance. Take FIG. 22 for example. A user (e.g., driver) interface includes the notification controller 38, the vehicle control device 16, the vehicle sensor 17, the communication device 18, the map database 19, the input device 20, the road projector 21, and the audio-output device 22. The notification controller 38 includes the input recognizing unit 3, the travel state detecting unit 7, the object position detecting unit 8, the communication unit 9, the category detector 10, the attribute detecting unit 2, the road condition detecting unit 11, the notification controller 14, the road projection controller 5, and the audio-output controller 15. In addition, a server 39 includes the message converting unit 4, the determining unit 12, and the message concept generating unit 13. Such a configuration enables a notification system to be established. The same holds true for the notification control apparatus 33 in FIG. 18, and the notification control apparatus 35 in FIG. 19.

The above configuration, in which the functions of each notification control apparatus are distributed, for placement, to the respective functions constituting the system, still achieves effects similar to those described in the foregoing embodiments.

Software that executes the process described in each of the foregoing embodiment may be incorporated to a server for instance. The server, when executing this software, implements notification control. A method for controlling notification includes the following: detecting an attribute of an object located around a subject vehicle; recognizing an input message entered by the driver of the subject vehicle; converting, in accordance with the detected attribute, the recognized input message into a notification message indicating the same meaning as the input message; and controlling projection of the converted notification message onto at least part of a road located around the object.

In this way, incorporating software that executes the process described in each of the foregoing embodiments to a server for operation achieves effects similar to those described in the foregoing embodiments.

It is noted that the individual embodiments of the present invention can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE SYMBOLS

1 notification control apparatus, 2 attribute detecting unit, 3 input recognizing unit, 4 message converting unit, 5 road projection controller, 6 notification control apparatus, 7 travel state detecting unit, 8 object position detecting unit, 9 communication unit, 10 category detector, 11 road condition detecting unit, 12 determining unit, 13 message concept generating unit, 14 notification controller, 15 audio-output controller, 16 vehicle control device, 17 vehicle sensor, 18 communication device, 19 map database, 20 input device, 21 road projector, 22 audio-output device, 23 processor, 24 memory, 25 memory, 26 child, 27, 28 notification message, 29 expectant mother 30 animal, 31 adult, 32 portable communication terminal, 33 notification control apparatus, 34 utterance summarizing unit, 35 notification control apparatus, 36 navigation unit, 37 pedestrian, 38 notification controller, 39 server.

The invention claimed is:

1. A notification control apparatus comprising:
   a processor to execute a program; and
   a memory to store the program which, when executed by the processor, performs processes of,
   detecting an attribute of an object located around a subject vehicle;
   recognizing an input message entered by a driver of the subject vehicle;
   converting, in accordance with the detected attribute, the recognized input message into a notification message indicating the same meaning as the input message; and
   controlling projection of the converted notification message onto at least part of a road located around the object.

2. The notification control apparatus according to claim 1, wherein
   the program, when executed by the processor, performs a process of generating a concept of the input message that is notified to the object, from the recognized input message, and
   the converting process comprises converting the generated concept of the input message.

3. The notification control apparatus according to claim 2, wherein
   the program, when executed by the processor, performs processes of,
   detecting a travel state of the subject vehicle,
   detecting a relative position of the object relative to the subject vehicle,
   detecting a road condition in a direction of travel of the subject vehicle, and
   determining presence or absence of the object to be notified, on the basis of the detected travel state, the detected relative position of the object, and the detected road condition, and
   upon determining the presence of the object to be notified, the converting process comprises converting the concept of the input message into the notification message.

4. The notification control apparatus according to claim 3, wherein
   the program, when executed by the processor, further performs a process of calculating a route from a current position of the subject vehicle to a destination, and
   the determining process comprises determining the presence or absence of the object to be notified, on the basis of the detected travel state, the detected relative position of the object, the detected road condition, and the calculated route.

5. The notification control apparatus according to claim 3, wherein
   the process of detecting an attribute comprises detecting an orientation of a face of the object as the attribute, and upon determining the presence of the object to be notified, the determining process comprises estimating a direction in which the object will move, on the basis of a change in the detected orientation of the face of the object, a change in the detected relative position of the object, and the detected road condition.

6. The notification control apparatus according to claim 5, wherein
upon determining that the object is located within a predetermined range that is predetermined based on a travel route of the subject vehicle, the converting process comprises converting the concept of the input message into the notification message in a form of a line drawing, and
upon determining that the object is located within the predetermined range, the process of controlling projection comprises controlling projection of the line drawing between the subject vehicle and the object.

7. The notification control apparatus according to claim 6, wherein
upon estimating that the object will move from the predetermined range toward the travel route of the subject vehicle, the process of controlling projection comprises controlling projection of the notification message onto a location toward which the face of the object is oriented.

8. The notification control apparatus according to claim 2, wherein
the recognizing process comprises recognizing a sound indicating the input message, and
the generating process comprises the concept of the input message from the recognized sound.

9. The notification control apparatus according to claim 8, wherein
the recognizing process comprises recognizing a gesture indicating the input message, and
upon recognizing the gesture and the sound, the generating process comprises generating the concept of the input message.

10. The notification control apparatus according to claim 2, wherein the recognizing process comprises recognizing a gesture for selecting one of a plurality of the objects located around the subject vehicle.

11. The notification control apparatus according to claim 10, wherein
the recognizing process comprises recognizing a sound indicating the input message,
upon recognizing the gesture and the sound, the generating process comprises generating the concept of the input message, and
the process of controlling projection comprises controlling projection of the notification message onto at least part of a road located around the object identified through the gesture.

12. The notification control apparatus according to claim 1, wherein the program, when executed by the processor, performs a process of controlling audio output of the notification message to the object.

13. The notification control apparatus according to claim 1, wherein the attribute of the object includes a person's age, a person's physical feature, an orientation of person's face, a language used by a person, and a kind of animal.

14. The notification control apparatus according to claim 1, wherein
the program, when executed by the processor, further performs a process of communicating with a portable communication terminal carried with a person who is the object located around the subject vehicle,
the communicating process comprises acquiring, from the portable communication terminal, language information that is set in the portable communication terminal, and
the process of detecting an attribute comprises detecting, as the attribute, the acquired language information.

15. The notification control apparatus according to claim 1, wherein the process of controlling projection comprises controlling projection of the notification message in animation form or of the notification message in blinking form onto the road.

16. The notification control apparatus according to claim 1, wherein
the recognizing process comprises a process of summarizing an utterance of the driver, and
the summarizing process comprises summarizing the utterance to form the input message.

17. The notification control apparatus according to claim 1, wherein
the recognizing process comprises recognizing a sight line of the driver and a sound of the driver, and
upon recognizing that the driver has uttered a word while looking at the object, the process of controlling projection comprises controlling projection of the notification message.

18. The notification control apparatus according to claim 1, wherein
the recognizing process comprises recognizing a gesture of the driver and a sound of the driver, and
upon recognizing that the driver has uttered a word while pointing at the object, the process of controlling projection comprises controlling projection of the notification message.

19. The notification control apparatus according to claim 1, wherein
the program, when executed by the processor, further performs a process of displaying at least one of a plurality of the objects located around the subject vehicle, and
when the driver selects the displayed object, the process of controlling projection comprises controlling projection of the notification message onto at least part of the road located around the selected object.

20. A method for controlling notification, comprising:
detecting an attribute of an object located around a subject vehicle;
recognizing an input message entered by a driver of the subject vehicle;
converting, in accordance with the detected attribute, the recognized input message into a notification message indicating the same meaning as the input message; and
controlling projection of the converted notification message onto at least part of a road located around the object.

* * * * *